(12) United States Patent
Tyler et al.

(10) Patent No.: US 11,456,695 B2
(45) Date of Patent: Sep. 27, 2022

(54) LEADING EDGE UNITS DEVICE AND METHODS

(71) Applicant: Erthos, Inc., Tempe, AZ (US)

(72) Inventors: James Scott Tyler, Queen Creek, AZ (US); Michael Gladkin, Tempe, AZ (US); William T Hammack, Taos, NM (US)

(73) Assignee: Erthos, Inc., Tempe, AZ (US)

( * ) Notice: Subject to any disclaimer, the term of this patent is extended or adjusted under 35 U.S.C. 154(b) by 0 days.

(21) Appl. No.: 17/153,845

(22) Filed: Jan. 20, 2021

(65) Prior Publication Data

US 2021/0281211 A1    Sep. 9, 2021

Related U.S. Application Data

(60) Provisional application No. 63/052,367, filed on Jul. 15, 2020, provisional application No. 63/021,928, filed on May 8, 2020, provisional application No. 62/963,300, filed on Jan. 20, 2020.

(51) Int. Cl.
*H02S 30/10* (2014.01)
*H02S 20/10* (2014.01)

(52) U.S. Cl.
CPC .............. *H02S 30/10* (2014.12); *H02S 20/10* (2014.12)

(58) Field of Classification Search
CPC ................................. H02S 30/10; H02S 20/10
See application file for complete search history.

(56) References Cited

U.S. PATENT DOCUMENTS

| | | | |
|---|---|---|---|
| 4,236,937 A | 12/1980 | Wihl | |
| 4,456,783 A | 6/1984 | Baker | |
| 5,121,583 A | 6/1992 | Hirai et al. | |
| 5,848,856 A | 12/1998 | Bohnhoff | |
| 6,105,317 A | 8/2000 | Tomiuchi et al. | |
| 6,182,403 B1 | 2/2001 | Mimura et al. | |
| 6,225,793 B1 | 5/2001 | Dickmann | |
| 6,380,481 B1 | 4/2002 | Müller | |
| 7,531,741 B1 | 5/2009 | Melton et al. | |
| 8,196,360 B2 | 6/2012 | Metten et al. | |
| 9,136,792 B2 | 9/2015 | Tomlinson | |

(Continued)

FOREIGN PATENT DOCUMENTS

| AU | 2018289521 A1 | 2/2020 |
|---|---|---|
| AU | 2018289521 B2 | 9/2021 |

(Continued)

OTHER PUBLICATIONS

U.S. Appl. No. 17/336,404, filed Jun. 2, 2021, James Scott Tyler.

(Continued)

*Primary Examiner* — Jayne L Mershon
(74) *Attorney, Agent, or Firm* — Charles Runyan

(57) ABSTRACT

Leading-edge units for a PV array comprising fastener or component holes for anchoring the array bonding the array and protecting array cabling. The leading-edge units provide a favorable aerodynamic shape to help deflect incoming wind, the channel rainwater and to protect the edge of the array. Methods having steps of placing modules contacting native topography or a smoothed or substantially flat portion of the ground in an array and holding the array together and down are also disclosed.

5 Claims, 13 Drawing Sheets

(56) References Cited

U.S. PATENT DOCUMENTS

| | | |
|---|---|---|
| 9,899,955 B2 | 2/2018 | Tomlinson |
| 10,033,328 B2 | 7/2018 | Wildes et al. |
| 10,826,426 B1 | 11/2020 | Tyler et al. |
| 10,992,250 B2 | 4/2021 | Ayers et al. |
| 11,031,902 B2 | 6/2021 | Ayers et al. |
| 11,078,632 B2 | 8/2021 | Byles |
| 2001/0008319 A1 | 7/2001 | Kistner et al. |
| 2002/0195138 A1 | 12/2002 | Itoyama et al. |
| 2003/0070368 A1 | 4/2003 | Shingleton |
| 2003/0094193 A1 | 5/2003 | Mapes et al. |
| 2005/0199282 A1 | 9/2005 | Oleinick et al. |
| 2006/0174931 A1 | 8/2006 | Mapes et al. |
| 2008/0135094 A1 | 6/2008 | Corrales |
| 2009/0114262 A1 | 5/2009 | Adriani et al. |
| 2009/0126555 A1 | 5/2009 | Olsson |
| 2009/0293941 A1 | 12/2009 | Luch |
| 2010/0108118 A1 | 5/2010 | Luch |
| 2010/0278592 A1 | 11/2010 | Walker |
| 2011/0024582 A1 | 2/2011 | Gies |
| 2011/0194900 A1 | 8/2011 | French, Sr. |
| 2011/0197524 A1 | 8/2011 | Sahlin |
| 2011/0277296 A1 | 11/2011 | Ramos |
| 2011/0303262 A1 | 12/2011 | Wolter |
| 2012/0085387 A1 | 4/2012 | French |
| 2012/0132253 A1 | 5/2012 | Shimizu |
| 2012/0186628 A1 | 7/2012 | Paine |
| 2012/0192926 A1 | 8/2012 | Kambara et al. |
| 2013/0056595 A1* | 3/2013 | Tomlinson ............... H02S 20/22 248/176.1 |
| 2013/0075152 A1 | 3/2013 | Mazzone |
| 2013/0276304 A1 | 10/2013 | Flaherty |
| 2013/0299655 A1 | 11/2013 | Sader |
| 2014/0083028 A1 | 3/2014 | Richardson |
| 2014/0130847 A1 | 5/2014 | West et al. |
| 2014/0251431 A1 | 9/2014 | West et al. |
| 2015/0090314 A1 | 4/2015 | Yang |
| 2015/0204044 A1 | 7/2015 | Botrie |
| 2016/0049898 A1 | 2/2016 | Tomlinson |
| 2016/0226434 A1 | 8/2016 | Tomlinson |
| 2017/0207742 A1 | 7/2017 | Roppelt |
| 2018/0274806 A1 | 9/2018 | Arndt |
| 2018/0323617 A1 | 11/2018 | Newdoll et al. |
| 2018/0337627 A1 | 11/2018 | Tomlinson |
| 2018/0366600 A1 | 12/2018 | Ayers et al. |
| 2018/0367090 A1 | 12/2018 | Ayers et al. |
| 2019/0372511 A1* | 12/2019 | Wang ................ B65D 90/00 |
| 2020/0287502 A1 | 9/2020 | Sewalt et al. |
| 2020/0366234 A1 | 11/2020 | Ayers et al. |
| 2021/0013826 A1 | 1/2021 | Ayers et al. |
| 2021/0091715 A1* | 3/2021 | Miller ................ F24S 25/617 |

FOREIGN PATENT DOCUMENTS

| | | |
|---|---|---|
| CA | 3067970 A1 | 12/2018 |
| CN | 111357192 A | 6/2020 |
| FR | 2957953 B1 | 5/2012 |
| KR | 101312027 B | 9/2013 |
| WO | 2011148139 | 12/2011 |
| WO | 2018237043 A1 | 12/2018 |

OTHER PUBLICATIONS

U.S. Appl. No. 17/336,407, filed Jun. 2, 2021, James Scott Tyler.
U.S. Appl. No. 17/336,417, filed Jun. 2, 2021, James Scott Tyler.
U.S. Appl. No. 17/336,431, filed Jun. 2, 2021, James Scott Tyler.
U.S. Appl. No. 17/336,442, filed Jun. 2, 2021, James Scott Tyler.
U.S. Appl. No. 17/336,699, filed Jun. 2, 2021, James Scott Tyler.
U.S. Appl. No. 17/337,234, filed Jun. 2, 2021, James Scott Tyler.
Mustache ("Topic: I built a solar powered off grid office from a Tuff-Shed," mrmoneymustache.com, publicly available as early as May 29, 2016), https://web.archive.org/web/20160529091143/https://forum.mrmoneymustache.com/do-it-yourself-forum!/i-built-a-solar-powered-off-grid-office-from-a-tuff-shed/ (Year: 2016).
Brooks et al. Evaluation of four geomembrane-mounted PV systems for land reclamation in Southern Arizona. 38th IEEE Photovoltaic Specialists Conference. IEEE, 2012.
ISR for PCT Application PCT/US2020/039092, fied Jun. 23, 2020, ISR date Oct. 26, 2020.
Sampson. "Solar power installations on closed landfills: Technical and regulatory considerations." Remediation and Technology Innovation Washington, DC (2009).

* cited by examiner

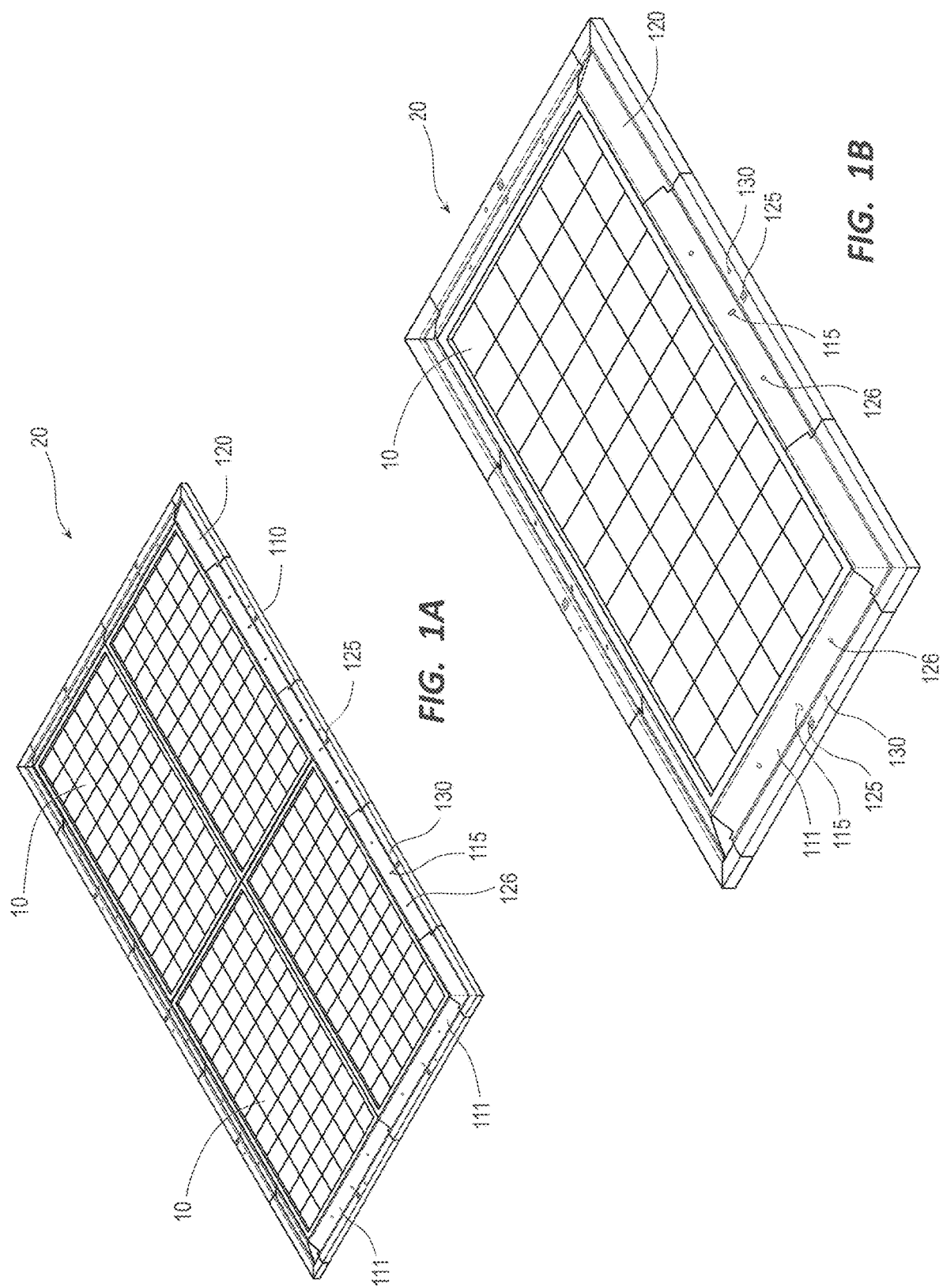

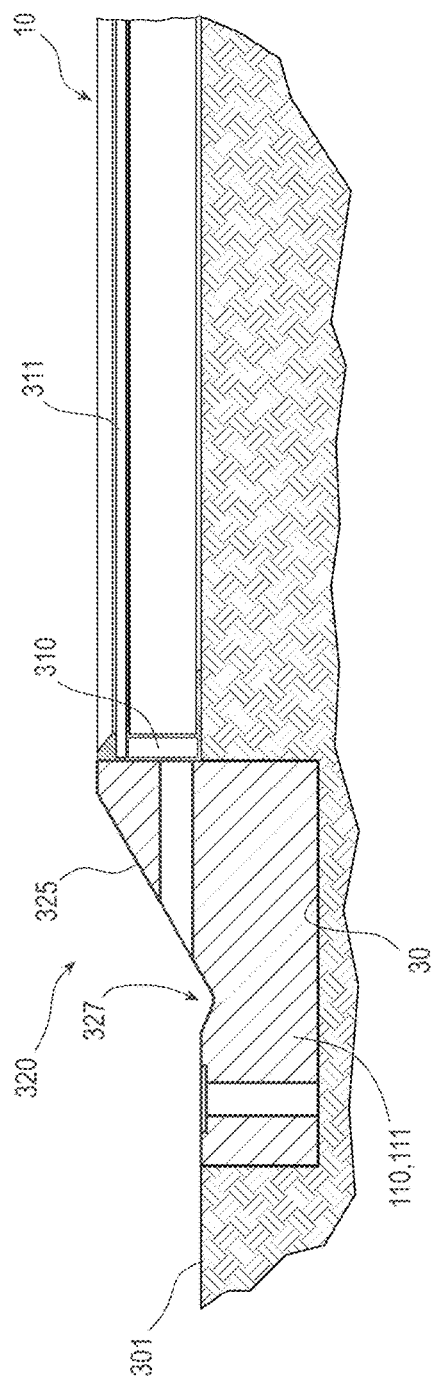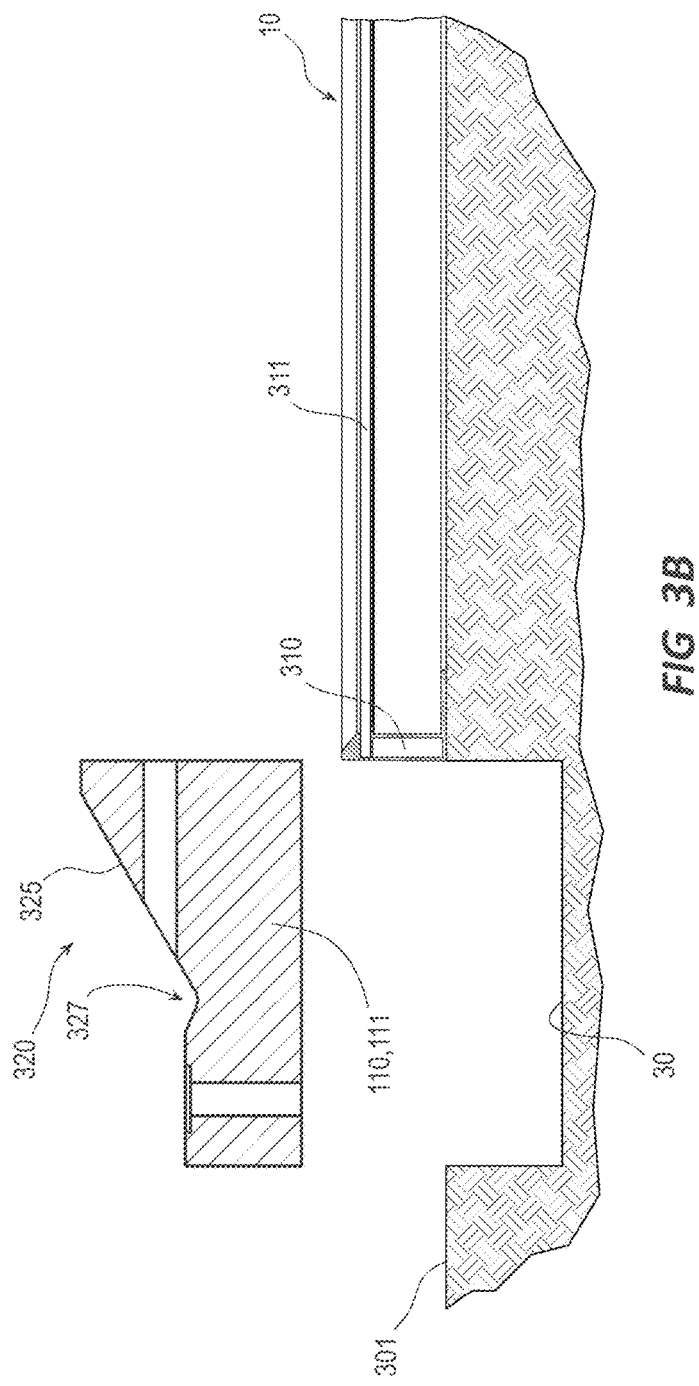

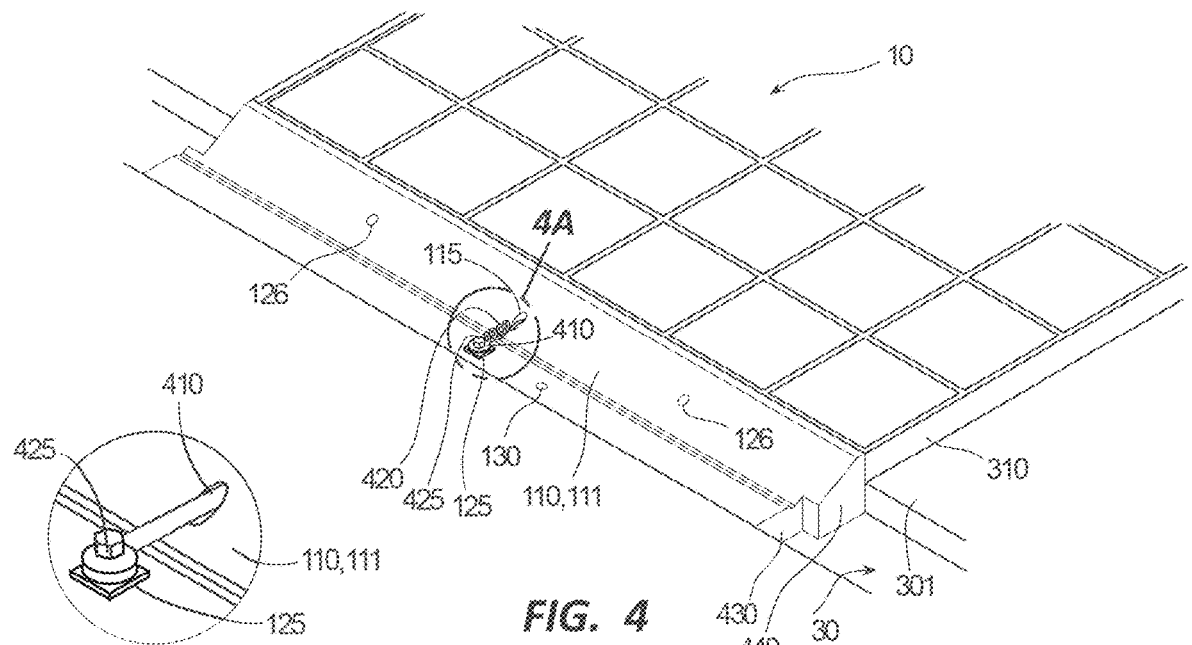
FIG. 4
FIG. 4A
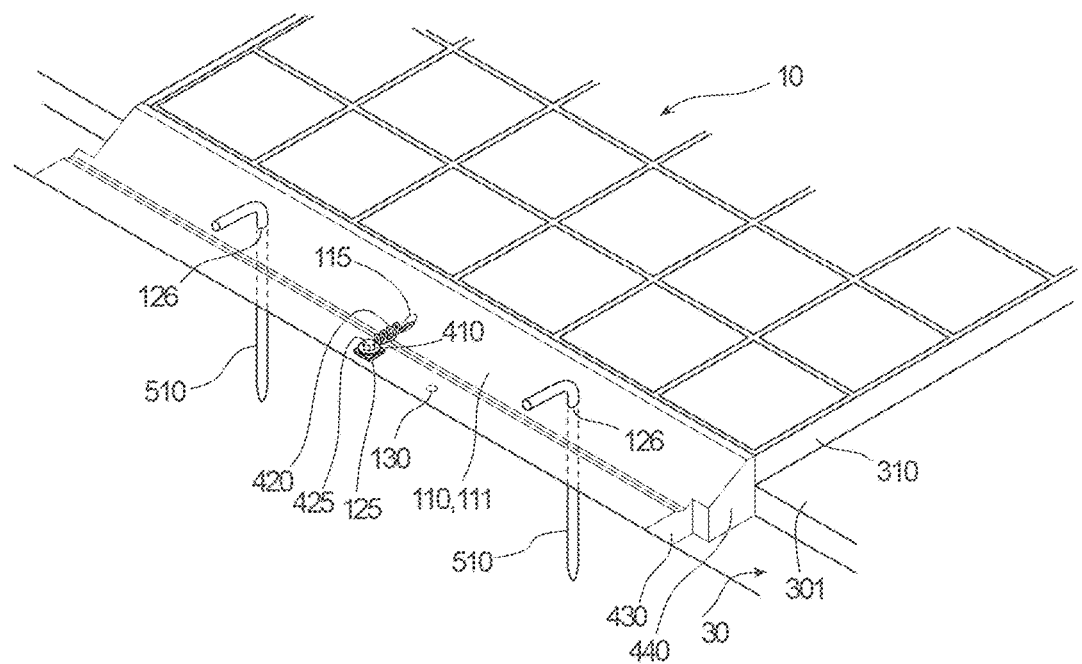
FIG. 5

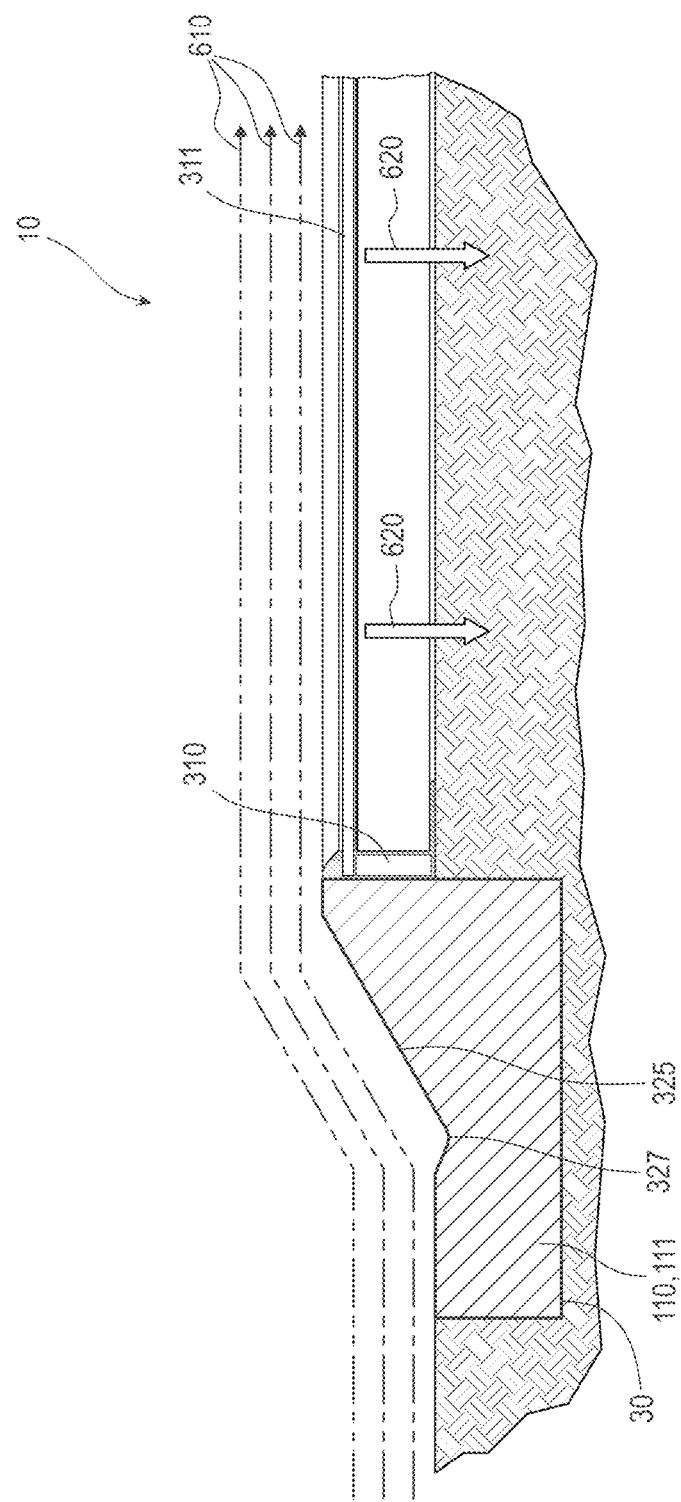

LEADING EDGE UNITS DEVICE AND METHODS

CROSS-REFERENCE TO RELATED APPLICATIONS

This application is related to and claims priority to U.S. Provisional patent application Numbers, which are incorporated by reference:
62/963,300, filed on Jan. 20, 2020.
63/021,928, filed on May 8, 2020.
63/052,367, filed on Jul. 15, 2020.

BACKGROUND

Ground Mount Solar Photovoltaic (PV) systems are commonly designed and implemented today as a renewable energy generation means for Utility-Scale Energy production providing both Transmission and Distribution level power to the US and Global Electrical Grids. Utility-Scale Ground Mount Solar PV systems use equipment from many producers of Fixed Tilt (FT) and Single Axis Tracking (SAT) structural racking systems, which are made from steel most commonly. Engineering firms design solar sites and arrays to site-specific geographical locations, solar insolation and weather data, and the authority having jurisdiction requirements to maximize module and string efficiency performance by orienting the modules to the sun at specified azimuth dependent FT angles and SAT orientations. Both FT and SAT Ground Mount Solar systems are azimuth dependent as the modules themselves are tilted toward the sun to maximize the full day potential from sunup to sundown. Due to the high cost of the modules, solar module efficiency and performance is the primary driver in the plant's design to optimize the plant's individual and combined performance to meet maximum efficiency of the solar panels.

Module frames are typically constructed of aluminum, which provides the main mechanical fastening surface and structural support securing the module frame to the rigid structural racking system. The module construction, module dimensions, modules per structural row, racking structure specifications, tilt angle, row azimuth, length of each rigid row, and a maximum height above grade at full tilt and stow of modules are all considered during the engineering of the racking system. Wind load, snow load, seismic, soil geology, and soil bearing are critical to designing the steel pile cross-sectional area, pile embedment, and pile reveal height as they are inherent to the structural racking as the Mean Wind Force Resisting System (MWFRS) to resist wind loading and failure to the module rows. Exterior rows in an array(s) typically see a higher loading than interior rows and require large steel in both pile cross-sections and structural racking components and hardware. Based upon these many factors, the structural wind loading requirements, structural steel design, and pile embedment is sized for the row and aggregate of rows to resist the wind loading for ground Mount Solar FT and SAT systems. Additionally, soil corrosion is considered when designing the structural racking system. With Ground Mount Solar PV systems, DC impressed current will cause accelerated corrosion rates to steel on a solar site as the electrons tend to separate quickly from the metal in corrosive soils, causing corrosion. Solar sites typically have a design life of more than 25 years, which means that corrosion resistance and mitigation are critical to the solar plant's long-term life. Means of corrosion mitigation include pile galvanization increase thickness, sacrificial post steel, epoxy coatings, and cathodic protection for ground Mount Solar PV systems.

ASCE site-specific wind 3-second gust criteria are utilized in the US to determine the maximum wind loading for each structural racking system per geographic location. Ground Mount Solar rows can typically exceed 10 ft above grade in elevation at maximum tilt and rigid single rows near 300 feet in length with multiple structural piles per row. A typical 1500 V tracking system row will have 3 strings of 28 modules, 84 modules per row, and a maximum tilt of 55 degrees. Three (3) second gust wind speed criteria per location vary between 85 to 130 mph+ and depend upon location. Based on the maximum wind speed at a given location, huge loads exist on both FT and Single Axis Tracker Ground Mount Solar PV systems due to their heights above grade, tilt angles of the modules, and large exposed surface areas of both front and back sides of the modules themselves. These loads from wind cause high-frequency cyclic loading on the modules and can commonly result in module microcracking over the plant's life. Module microcracking can cause premature degradation of the modules leading to reduced efficiency and even complete failure.

Electrically, solar panels or modules are assemblies of multiple photovoltaic (PV) cells hardwired to form a single unit. Multiple solar panels are connected by stringing the positive and negative DC leads in series from module to module, typically by skip stringing. The number of modules in a single string is determined by the maximum DC voltage class of the solar site (1000 V or 1500 V typical for Utility-scale), module BIN class, and the number of modules in series determined by the module voltage specifications and site-specific temperature data. Multiple strings of modules per individual row aggregate DC power via DC Home-run conductors to either an intermediate Combiner Box or directly to an Inverter. Module frames are electrically bonded and grounded to the rack's structural components to prevent electrical safety hazards either by UL listed hardware or approved bonding straps and assemblies. The racking components themselves are then bonded to the posts. The posts typically ground back to the inverter grounding system or ground ring utilizing an appropriately sized grounding conductor. Grounding systems for the steel racking structure can be quite complicated due to all the structural racking assembly components.

In each structural racking system and site design, row to row spacing is included. The shading of adjacent rows due to the sun's orientation and the structural system's tilt angle throughout the day is minimized, thereby maximizing energy production. Row to row spacing typically means that a Ground Coverage Ratio (GCR) for a solar site utilizing FT or SAT technology is around GCR=35%, with row spacing typically varying between 15 to 21 ft center on center pile per row. Designs can increase the number of rows per array by shrinking the row spacing on a given land plot. But shading increases when row spacing decreases. Daily energy production of the individual rows falls as they begin to shade each other. Increasing the row to row spacing will decrease shading. It will also increase land use per MWac and the distance of rows to their respective electrical connections at the combiner boxes or inverters, increasing the total amount of DC and AC cable required for a given solar site.

Multiple rows of modules form an Array, with multiple arrays aggregating power into typically 2MWac, 3MWac, or 4MWac centralized inverter configurations called Blocks. One or more blocks are then aggregated to meet the total required Utility Interconnect MWac requirements of the Interconnection Agreement of the Utility (or merchant sale of power). Module BIN class (measured in Watts per panel), string size (number of modules connected in series), numbers of rows (3 strings per row typical), array sizes (collection of rows), and block sizes (collection of arrays) are all dependent on project-specific details including land constraints, geographical location, selected equipment sizes, utility interconnect requirements, and many other constraints. Block sizes vary by designer, project, and equipment.

FT and SAT racking systems' conventional goals have been to orient the module to the sun, resist mechanical loading generated by wind loads, snow loads, frost heave, and prevent structural failure because of soil corrosion. Solar module optimization to the sun's incidence angle to maximize module efficiency has been the design standard because the modules have been the most expensive part of the plant by many orders of magnitude. By orienting the module to the sun and incorporating the cost of a ground mount structural racking system as a balance of system cost, the lowest cost of electricity (LCOE) for Utility Solar PV has historically been able to be achieved.

As module prices have fallen by many orders of magnitude over the last decade and module efficiencies improved, an inflection point occurred where the LCOE model changed. Once the price of the module dropped below this inflection point, the cost of the structural racking system became cost prohibitive as the cost of the module dropped to a point where it no was no longer a net benefit to utilize the structural racking equipment and associated costs to orient the module to the sun. By eliminating the structural racking system, capital cost, its row spacing requirements, installation costs, and associated components, a lower LCOE could be achieved compared to Ground Mount systems.

Earth Mount Technology simplifies the solar array, its number of components, and its capital equipment and labor costs by eliminating the structural racking system between the module and the earth. Earth Mount Solar (as compared to Ground Mount Solar described above) places the module directly in contact with the earth without an intermediate structure between the module and the earth. The earth then becomes the primary structural supporting means, and the module and strings of modules are now oriented directly to the earth. There is some efficiency loss of the modules (by not optimizing the tilt angle or tracking of the modules such as is historically performed). Still, the capital equipment and associated labor cost reductions far outweigh the loss of module efficiency resulting in a much lower Levelized Cost of Electricity than conventional ground mount technologies. Earth Mount technology has no steel posts, no steel racking, no cable management along the structure, no row shading from row to row, decrease land use per MWac, no structural wind loading below 130 mph due to proximity to grade and aerodynamic design, azimuth independent array layouts, no underground structural pile penetrations, no steel corrosion, no frost heave, no underground pile risk, no cost of installation of the mechanical structure to support the modules, no wind load on the modules below 130 mph as designed, reduced DC cable length, and many other advantages.

While the individual modules of an Earth Mount system do not produce as much energy as their competitive FT and SAT systems, the reduction in the cost of the structural components and associated labor, reduction of land, etc. infers that more modules can be employed, thereby producing the same energy as an FT or SAT PV plant during the detailed energy modeling and design phase. By increasing the number of total modules installed onsite (and increasing the DC:AC ratio compared to FT/SAT), the Earth Mount technology can produce the same energy profile while reducing the LCOE compared to a similar conventional Ground Mount Technology.

Earth Mount Technology can produce the same energy as an FT or SAT profile with less than half the land consumption per MWac of the solar PV plant, over 50% greater speed of construction installation, reduced wind loading, snow loading, and mechanical module stress from wind, and far lower LCOE as compared to typical FT and Single Axis Tracker Ground Mount systems. By placing the modules directly on the earth, the wind loading is reduced, the microcracking potential is significantly reduced, steel corrosion is eliminated, and the plant's life expectancy is significantly increased.

SUMMARY

Utility-scale PV arrays comprising several PV modules on or contacting native topography or a smoothed or substantially flat portion of the ground in an array and a perimeter leading edge that comprises a leading-edge unit adapted to direct wind across the array are disclosed. In some versions, the perimeter leading edge comprises more than one leading-edge unit. Module connecting cables pass through the module alignment holes. In some versions, the cable passes through between 1 and 100 consecutive PV modules.

In some versions, the leading-edge units have upper sides, horizontal portions, angled portions, module alignment holes, and bonding holes. In some versions, the leading-edge units have thick flanges, front edges, vertical walls, inclined surfaces, and back edges.

The leading-edge units have a capped leading-edge base with a longitudinal slot and a cap with a tongue in these or other versions. In some versions, the tongue is disposed in the slot.

In these or other versions, the leading-edge units also have one or more clips extending vertically from the back edge of the panel receiving surface. In these or other versions, the leading-edge units further have tubular standoffs extending horizontally back and down from a bottom edge of the vertical wall and forming a panel receiving surface on top of the standoff.

Methods having the steps of providing PV modules, placing several PV modules on, or contacting native topography or a smoothed or substantially flat portion of the ground in an array, and holding the array together and down are also disclosed. In some versions, holding the array together and down comprises causing air pressure to push the array against native topography or a smoothed or substantially flat portion of the ground. In some methods, causing air pressure to push the array against native topography or a smoothed or substantially flat portion of the ground has a step of providing a perimeter leading edge that has units that direct wind across the array. In some versions, the leading-edge units have module alignment holes and bonding holes.

BRIEF DESCRIPTION OF FIGURES

The figures that accompany the written portion of this specification illustrate variations and use methods for the present devices.

FIG. 1A is a perspective view of a version of the disclosed devices.

FIG. 1B is another perspective view of a version of the disclosed devices.

FIG. 3A is a cross-section view of the device of FIG. 1A.

FIG. 3B is another cross-section view of the device of FIG. 1A.

FIG. 4 is another perspective view of the device of FIG. 1A.

FIG. 4A is an expanded view of the device of FIG. 4.

FIG. 5 is another perspective view of the device of FIG. 1A.

FIG. 6 is another cross-section view of the device of FIG. 1A.

DETAILED DESCRIPTION

Figure 1C:
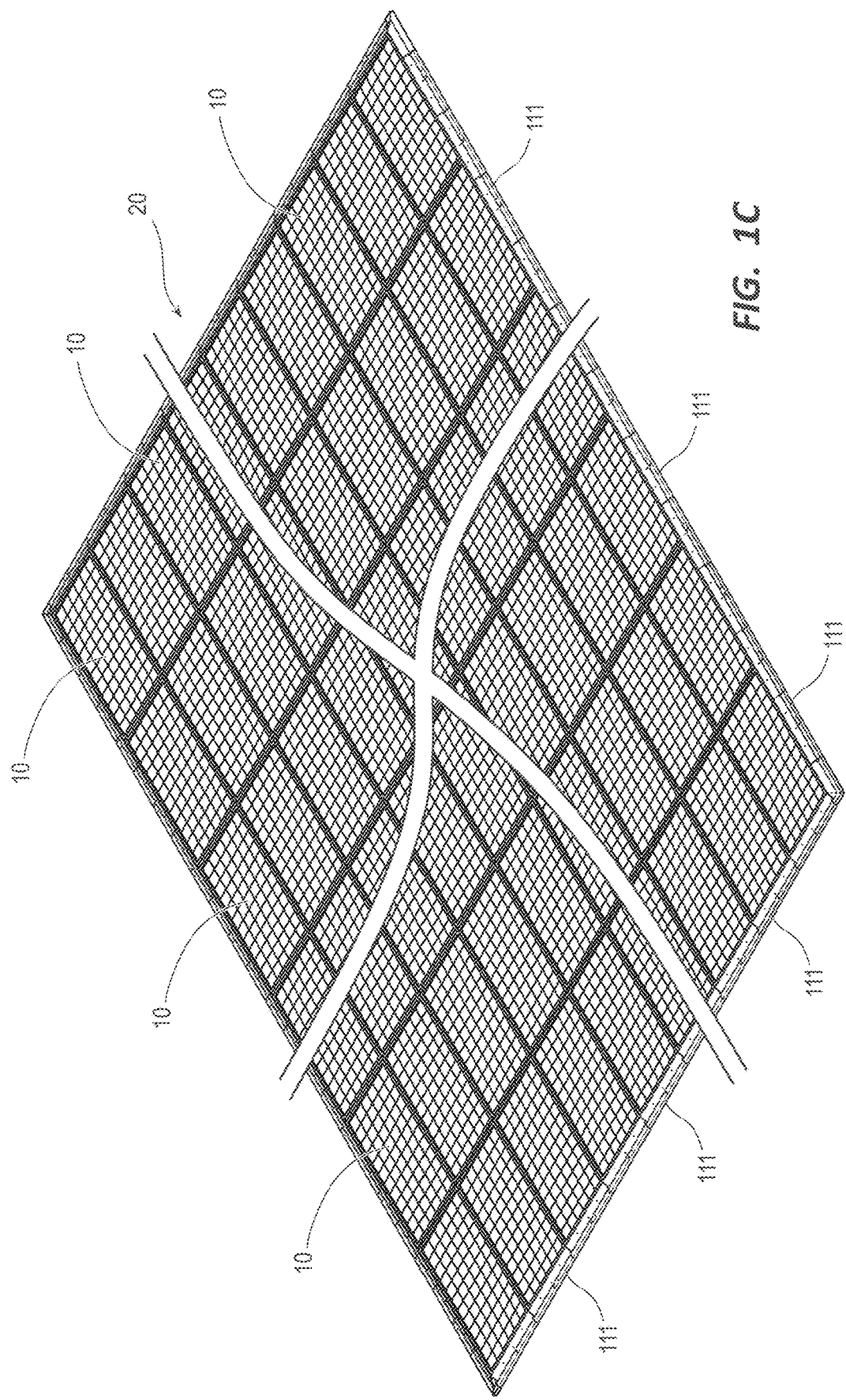
FIG. 1C is yet another perspective view of a version of the disclosed devices.

The disclosed technology provides a component for generating electricity using commercially available, utility-scale, solar photovoltaic (PV) modules 10, new and novel adaptations of these, or new module technologies. These components frame or form a perimeter around a PV module array(s) that is Earth-mounted. Earth-mounted means mounted on or contacting native topography or a smoothed or substantially flat portion of the ground without an intermediate structure between the module and the earth. This mounting establishes an Earth orientation of the solar PV modules 10 because the ground or terrain orients the modules rather than the angle of impinging solar rays. The disclosed components are called leading-edge units 110, 111. This name fits because the units present a favorable aerodynamic profile to winds that move over the solar plant, specifically over module arrays and blocks. Earth Mount technology defines an island as an array or arrays continuously surrounded by a perimeter of leading-edge units. The islands form a primary subdivision for all the modules 10 deployed in the plant. In some versions, the leading-edge units also direct water generally over the array in sheet flow, preventing water flow from undercutting the modules and arrays and minimizing soil erosion.

Modules 10 are placed in an edge-to-edge and end-to-end grid pattern, like with floor tiles. Typically, the plant's utility-scale nature dictates using this system at 600 volts DC or above. But in principle, this technology is also suited for lower voltage systems. The leading-edge units 110,111 facilitate ground placement of solar modules 10, as desired. These leading-edge units 110, 111 do not limit the modules' attachment method to one another or the earth. This module 10 arrangement with a perimeter of leading-edge units 110, 111 substantially increases the downward pressure forces experienced by the island or array as the wind blows across them. Therefore, the leading-edge units 110, 111 improve the stability and security of the islands or arrays. And the module 10 arrangement facilitated by the leading-edge units 110, 111 allows for more economical surface dust removal from or cleaning the modules' surface.

In some versions, the leading-edge units 110,111 of the Earth mount system encompasses all Earth-mounted solar PV module 10 arrays. In some versions, the leading-edge units 110,111 are concrete (or similar material) and can be poured and shaped in place or pre-cast into individual units. Sometimes, the leading-edge units 110,111 eliminate any need for rigid structural support systems or ground penetrations inside the array border.

The leading-edge units 110,111 dictate module 10 locations within the leading-edge perimeter. Sometimes this facilitates aligning modules 10 one to another. The leading-edge units 110, 111 can also be buried or partially buried within the earth by creating a ditch and placing or pouring the units inside the ditch. This arrangement curtails lateral movement and allows the sheet flow of rainwater under modules 10. Partial burying combats erosion underneath the leading-edge units 110, 111, and into the array's interior. And in some versions, culvert portions in some units allow rainwater to flow along the leading-edge units' 110, 111 lengths. These units deflect the wind over Earth-mounted modules 10, which blocks horizontal wind loads on module frames and prevents wind from lifting modules 10 by flowing between modules 10 and the earth.

In some versions, leading-edge units 110, 111 anchor the array down and serve as a ballast to the array, sometimes through the units' weight and sometimes through the units' design. For situations that warrant doing so, the leading-edge units 110, 111 have threaded bolt inserts or other connections to terminate mechanically the flexible connections that span the array. For environments like those with high seismic activity, optional anchor holes can receive anchor rods. This arrangement better secures the leading-edge units 110, 111, and array. And the units provide a mechanical barrier to the edges of the surrounded modules 10, which makes damage less likely.

COMPONENT NUMBERS

10 PV module
20 PV module group
30 ditch
40 home-run wiring
110 long leading-edge unit
111 short leading-edge unit
115 module alignment hole
120 leading-edge corner unit
125 threaded insert
126 anchor hole
130 bonding hole
301 grade
310 module frame 311 semiconductor layer
320 upper side (US)
321 horizontal portion
325 angled portion
327 culvert portion
410 connecting cable
420 cable swage
425 cable anchor
430 scarf joint notch
440 leading-edge end
510 anchor or leading-edge anchor
610 wind vectors
620 downforce vectors
700 leading-edge units
710 anchor hole
720 capped leading-edge base
725 cap
726 tongue
727 top
730 thick flange
731 thin flange
733 front edge
740 tall flange wall
741 tall flange incline surface
745 short flange wall
746 short flange incline surface
750 back edge
760 cavity
810 vertical groove
820 slot
1010 NS leading-edge unit
1011 NS wall
1012 NS upper side
1014 angled portion
1020 NS spring clip
1022 NS module alignment slot
1030 NS rear edge
1031 NS bonding slot
1035 NS anchor hole
1040 NS thick flange
1041 NS thin flange
1042 NS angled portion
1050 NS screw anchor
1055 NS cavity
1060 glass
1110 standoff (SO) leading-edge unit
1120 SO spring clamp
1122 SO module alignment slot
1126 SO bonding slot
1140 SO thick flange
1142 SO angled portion
1143 SO wall
1150 standoff
1210 gravel
1220 foundation
1230 post
1240 connecting cable Unless otherwise indicated or dictated by the specific discussion, the versions' features are interchangeable between versions.

FIG. 1A shows a representative PV module group 20 with four PV modules 10. The perimeter of the PV module group 20 has long leading-edge units 110, leading-edge corner units 120, and short leading-edge units 111. Long leading-edge units 110 and short leading-edge units 111 have module alignment holes 115 disposed horizontally through the unit, threaded insert 125, anchor holes 126, and bonding holes 130. FIG. 1B shows a representative utility-scale PV module group 20'.

Figure 2A:
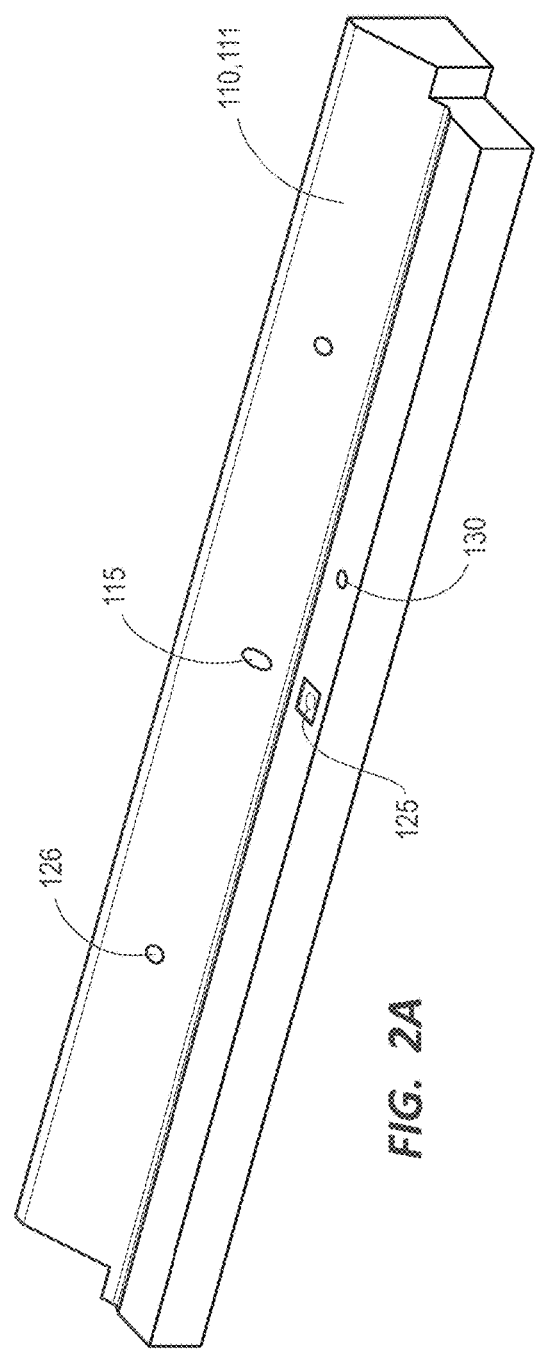
FIG. 2A is a close-up perspective view of the device of FIG. 1A.

FIG. 2A shows a close-up view of a long leading-edge unit 110 (although short leading-edge unit 111 is similar). Besides module alignment hole 115, bonding hole 130 is disposed horizontally through leading-edge units 110, 111, and threaded insert 125 is disposed vertically through leading-edge units 110, 111. Bonding hole 130 is situated such that the cables for the electrical bonding system of the PV module group 20 extend out from modules 10 to be connected or bonded to ground. Thus, all the electrically conductive components inside of the array, such as PV module frames 310, are electrically bonded to ground. In some versions, module alignment or connection cables extend through modules 10. The threaded insert 125 allows these cables to connect to leading-edge units 110, 111 after passing through module alignment hole 115. Anchor holes 126 are optional and are useful when the site calls for more horizontal constraint on PV modules 10 than the group into PV module group 20 provides. For instance, anchor holes 126 may be used in sites where higher seismic activity could occur.

Figure 2B:
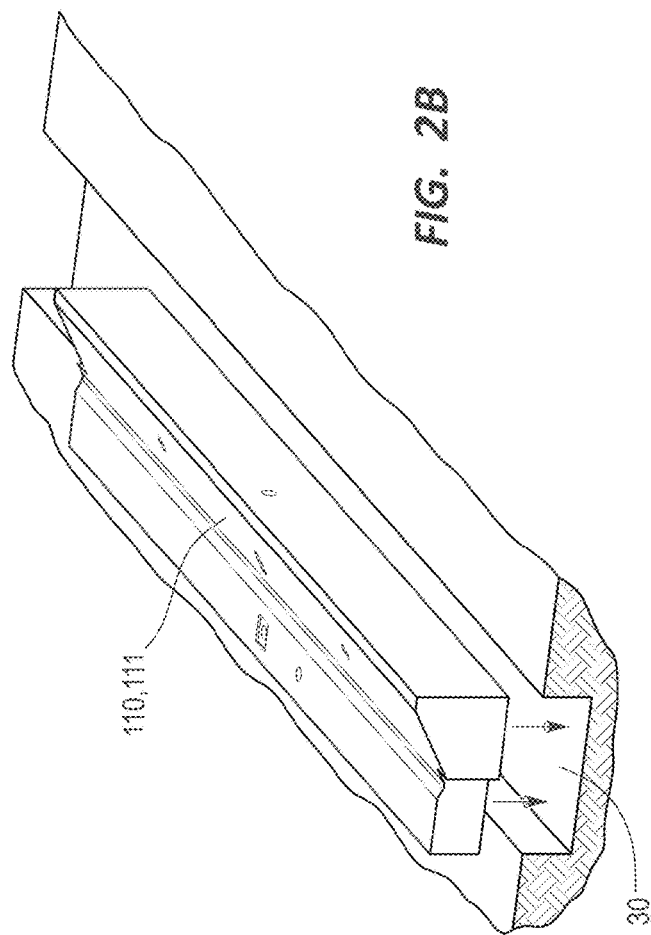
FIG. 2B is another perspective view of the device of FIG. 1A.

FIG. 2B shows a leading-edge unit 110, 111 placed into ditch 30 in this version. This placement adds additional resistance to horizontal displacement—ditch 30 holds leading-edge units 110, 111 in place more so than top-of-the-ground placement.

FIG. 3A shows a cross-sectional view of leading-edge units 110, 111. The US 320 of leading-edge unit 110, 111 has a horizontal portion 321, an angled portion 325, and a culvert portion 327. This figure also shows PV module group 20, which comprises PV modules 10. PV modules 10 have PV module frame 310 and semiconductor layer 311. The figure also shows the surface of the earth, grade 301. In this version, the horizontal portion 321 is substantially even with grade 301. For this disclosure, "substantially even with grade" means within plus or minus 25 mm or plus or minus 17 mm of coplanarity between horizontal portion 321 and grade 301.

FIG. 3B shows an exploded, cross-sectional view of leading-edge units 110, 111. As the figure shows, leading-edge unit 110, 111 sits in ditch 30. (While module 10 is shown in place for illustrative purposes, this figure doesn't imply that module 10 must be or can be placed or installed before leading-edge unit 110, 111 is placed in ditch 30).

FIG. 4A shows leading-edge unit 110, 111 installed against PV module 10. In this figure, cable 410 extends from PV module 10 (hence, out from PV module group 20). Connecting cable 410 is swaged at its end in some versions. But in the version in this figure, connecting cable 410 terminates at a thimble with the cable end wrapping around the thimble and swaged or connected with wire-rope clips. Connecting cable 410's termination is shown as cable swage 420. In this depiction, cable swage 420 connects to cable anchor 425, which is a bolt threaded into threaded insert 125. Other forms of cable anchor 425 are useful. FIG. 4A also shows a scarf joint notch 430 on leading-edge end 440.

FIG. 5A shows substantially the same view as FIG. 4A but with an additional depiction of anchors 510 or leading-edge anchors 510 installed vertically through anchor holes 126. Anchors 510 in this depiction are standard rebar rods extending a distance into the ground. This distance is determined by seismic, wind speed, and geologic conditions on a per-site basis based on structural loading typically 1 to 4 ft in depth. Other rods, screws, stakes, etc., are equally suitable for use as anchor 510.

FIG. 6A is another depiction of the end 440 of leading-edge unit 110, 111. Number 610 represents wind (wind vectors) that flow over PV module group 20. Leading-edge units 110, 111 redirect incoming wind over PV module group 20, preventing wind from impinging on the edges of PV module 10. Various pressure equalization features between the underside of PV module 10 or PV module group 20 and the upper surface of module 10 or module group 20 prevent the buildup of pressure gradients between the upper and lower sides of module 10 or module group 20. This arrangement of the leading-edge units 110, 111 and pressure equalization features deflects wind or wind gusts over the surface of the PV module groups 20. Wind deflection creates a net downward force on PV module group 20, as indicated by number 620. Thus, wind flow over PV module group 20 holds PV module group 20 down more or better than calm air.

Figure 7A:
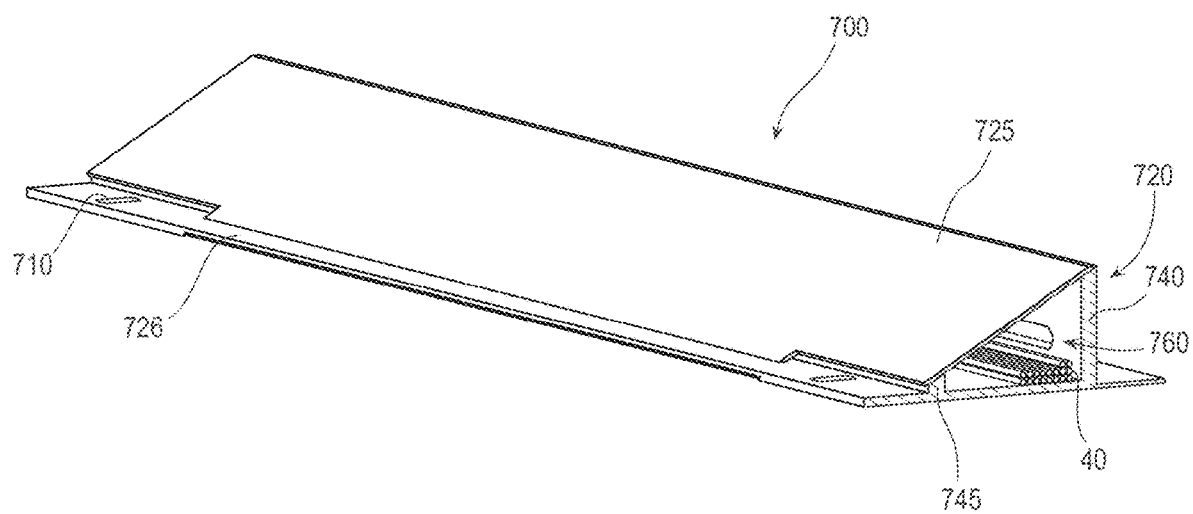
FIG. 7A is a perspective view of another version of the disclosed devices.

FIG. 7A shows another version of a leading-edge unit. This version is called a capped leading-edge unit 700 because it has a cap 725 for capped leading-edge base 720. Cap 725 comprises tongue 726 and cap upper surface 727. Base 720 comprises thick flange 730, thin flange 731, front edge 733, tall flange wall 740, tall flange inclined surface 741, short flange wall 745, short flange inclined surface 746, and back edge 750.

Figure 7B:
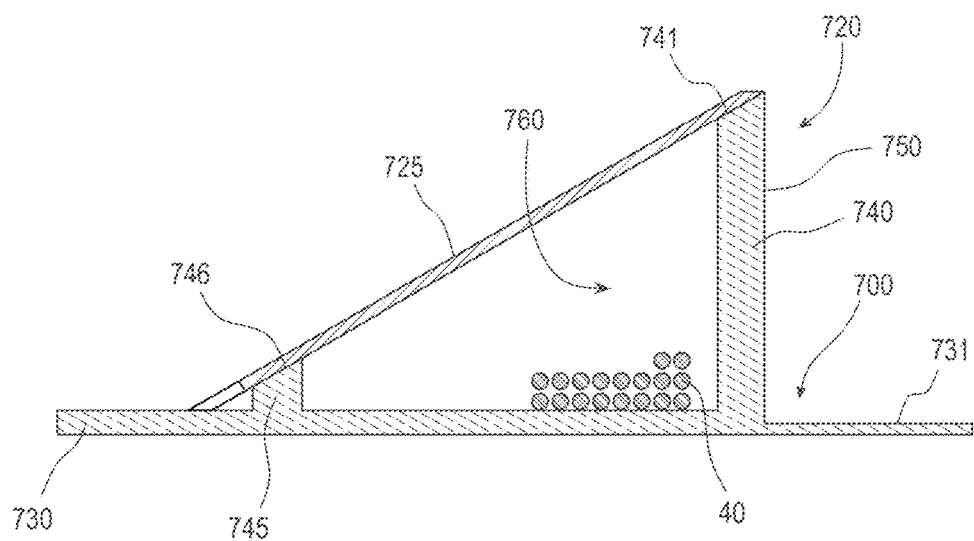
FIG. 7B is a cross-section view of the device of FIG. 7A.

Capped leading-edge base 720 can be described as an extrusion having the profile depicted in FIG. 7B. (Despite this description, capped leading-edge base 720 can be manufactured using any well-known method). Tall flange wall 740 connects to or is integral with thick flange 730, forming a back edge 750. Short flange wall 745 connects to or is integral with thick flange 730. In some versions, short flange wall 745 connects to thick flange 730 set back from the front edge 733 of thick flange 730. The variance in height between tall flange wall 740 and short flange wall 745 causes cap 725 to connect to base 720 at an incline. Tall flange inclined surface 741 and short flange inclined surface 746 substantially match the incline that tall flange wall 740 and short flange wall 745 cause in cap 725. FIG. 7A shows anchor hole 710.

Figure 8A:
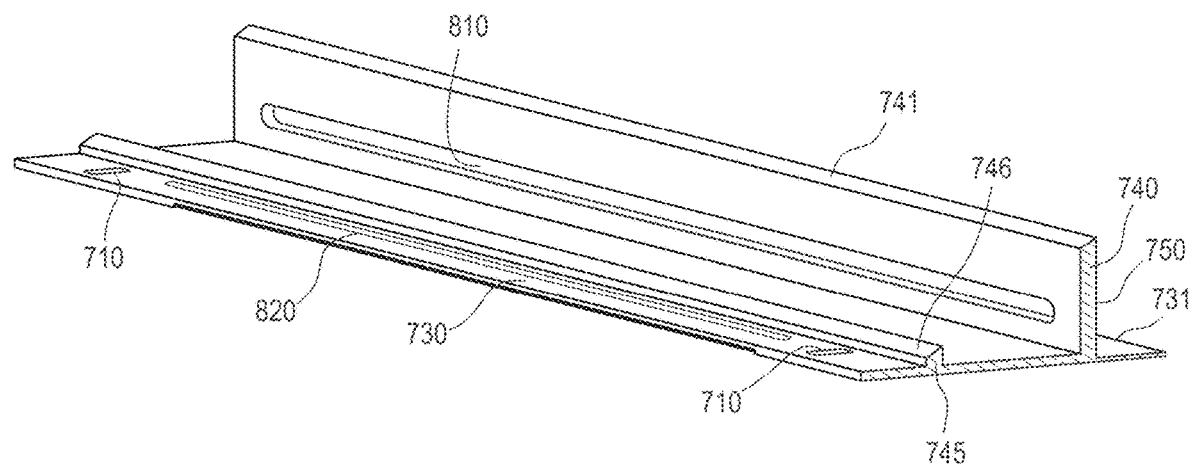
FIG. 8A is a perspective view of a portion of the device of FIG. 7A.
Figure 8B:
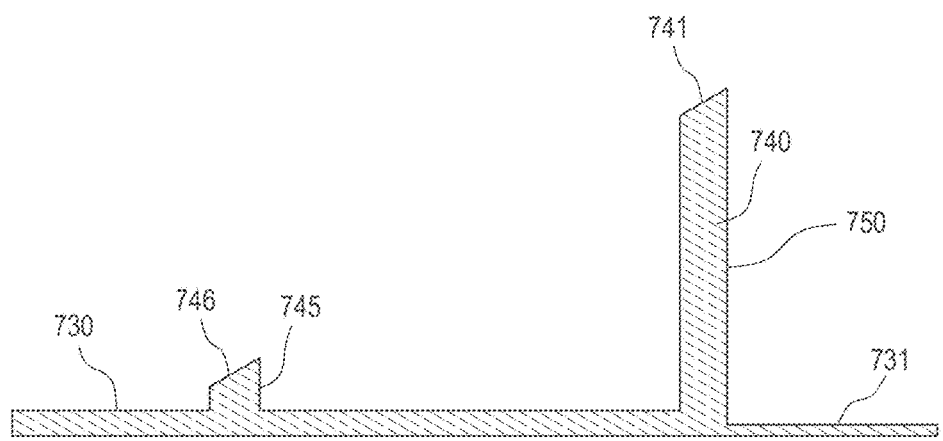
FIG. 8B is a cross-section view of the device of FIG. 8A.

FIG. 8A shows another, perspective, view of capped leading-edge base 720.

Figure 9A:
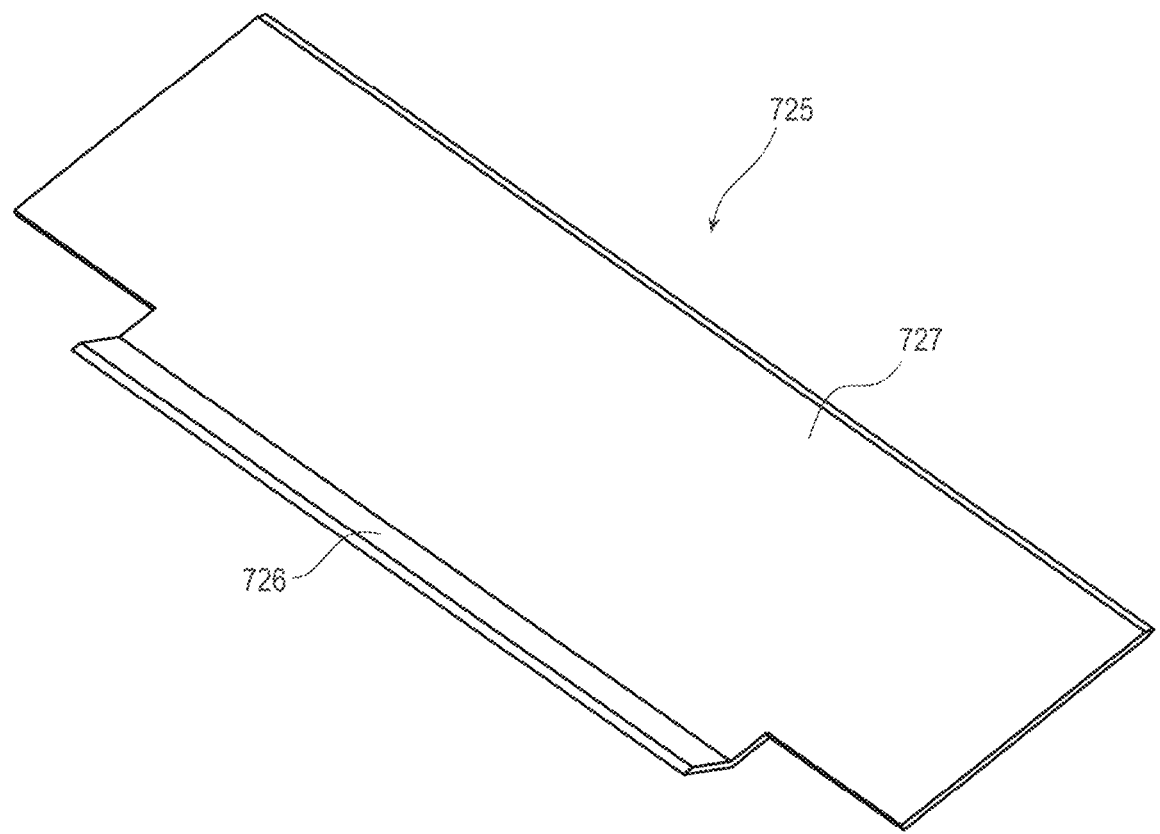
FIG. 9A is a perspective view of a portion of the device of FIG. 7A.
Figure 9B:
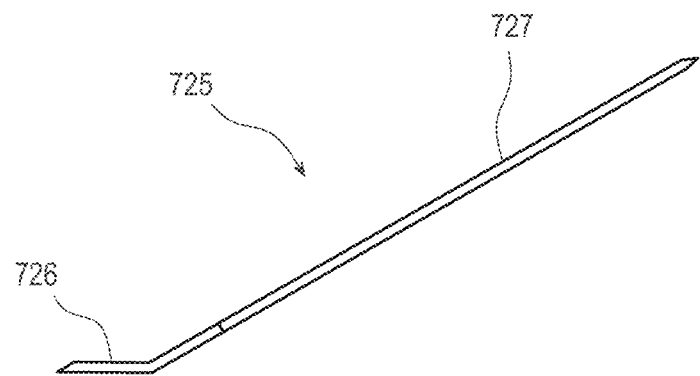
FIG. 9B is a cross-section view of the device of FIG. 9A.

Besides the elements in FIG. 7A and FIG. 7B, FIG. 8A shows anchor hole 710, optional groove 810, and slot 820. Slot 820 is between short flange wall 745 and front edge 733. Tongue 726 (FIG. 9A) fits into slot 820. The optional grove 810 allows internal array cabling to pass into cavity 760.

These components can be produced using any commonly used production method, such as extrusion. Metal- and polymer-based materials are useful for these components. The width of capped leading-edge units 700 ranges from 3 to 4 ft. The length of capped leading-edge units 700 ranges from 6 to 7 ft. The height of capped leading-edge units 700 ranges from 1 to 2 in from grade to top of module frame on grade. Those of ordinary skill in the art will recognize that the capped leading-edge units' dimensions influence their function, including their aerodynamic function. Various portions of capped leading-edge units 700 have thicknesses or wall thicknesses ranging from 0.05 in to 0.5 in for extruded versions.

When cap 725 connects to base 720, it forms a cavity 760 running the length of capped leading-edge base 720. In some versions, cavity 760 receives electrical cabling from PV module group 20, such as home-run wiring 40 to AC-DC inverters. This arrangement allows simple access to home-run wiring 40.

Figure 10A:
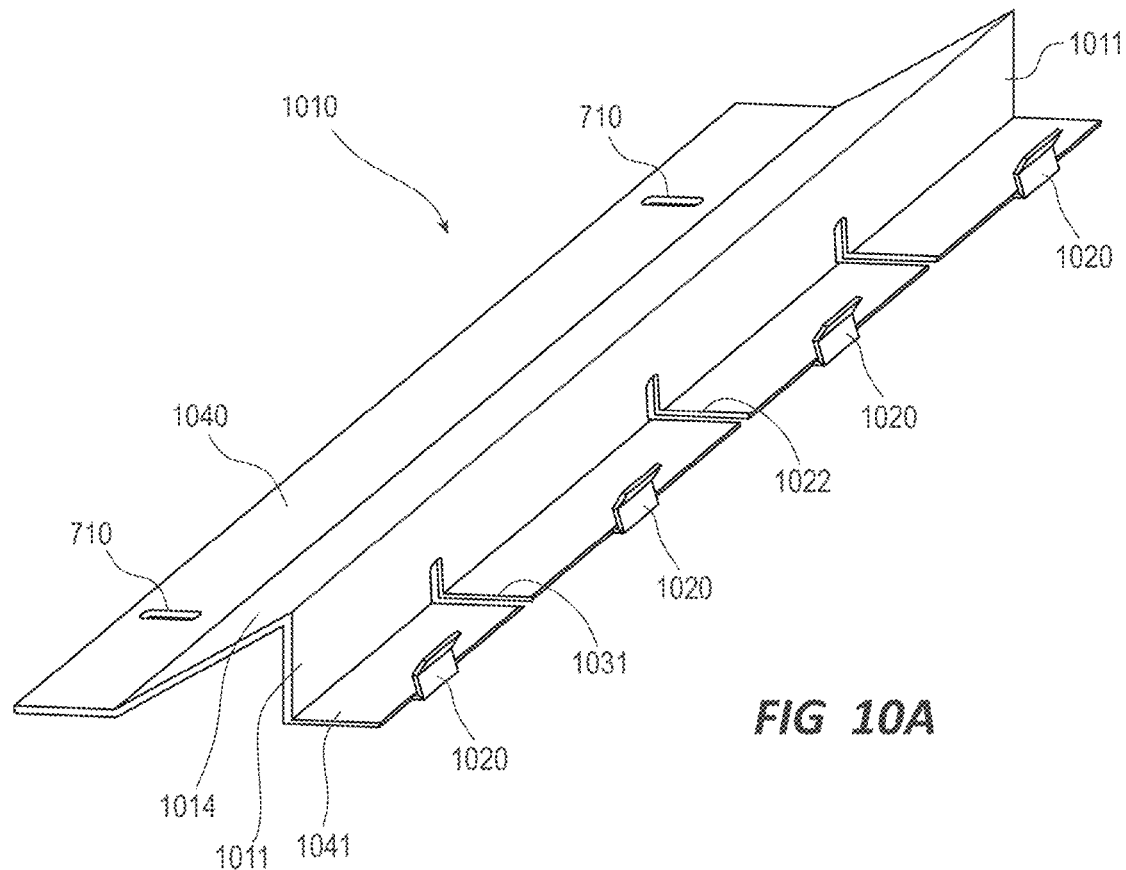
FIG. 10A is a perspective view of another version of the disclosed devices.
Figure 10B:
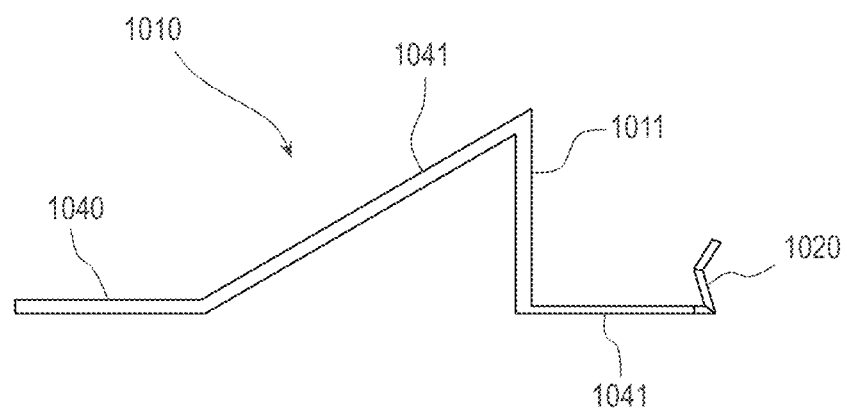
FIG. 10B is a cross-section view of the device of FIG. 10A.

FIG. 10A shows another version of the edging—no stand-off (NS) leading-edge 1010. NS leading-edge unit 1010 comprises NS thick flange 1040 and NS thin flange 1041 connected by NS angled portion 1042 and NS wall 1011. NS thin flange 1041 has 2-8 spring clips 1020 spaced along and extending up from rear edge 1030. FIG. 10B shows a cross-section of NS leading-edge unit 1010.

Figure 10C:
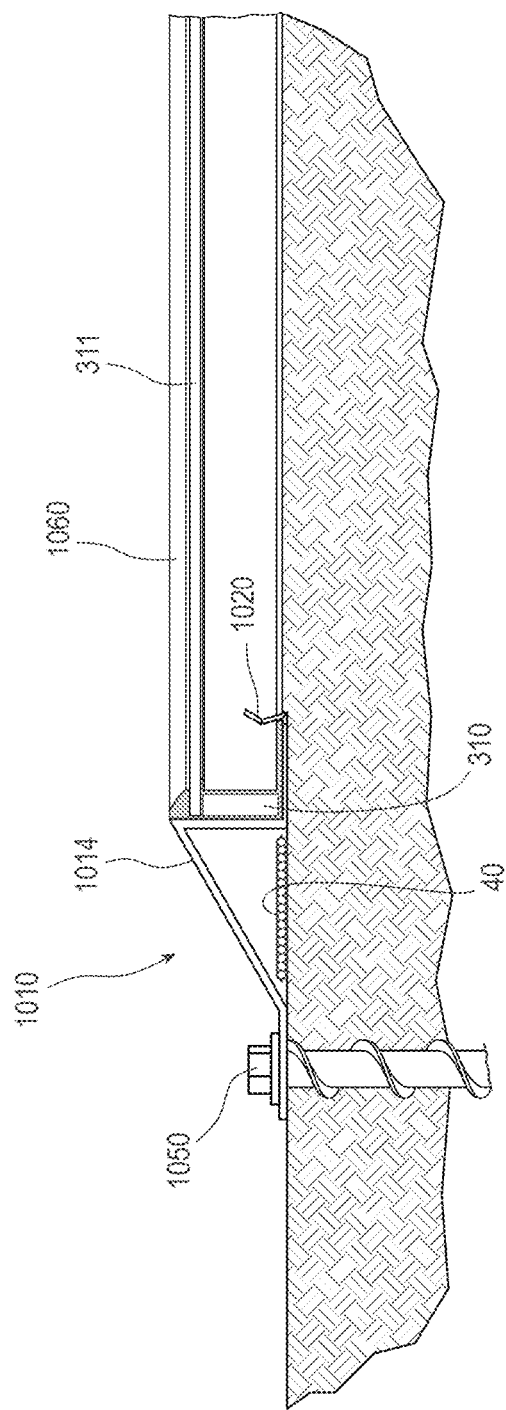
FIG. 10C is another cross-section view of the device of FIG. 10A.

FIG. 10A also shows NS module alignment slot 1022, NS bonding slot 1031, and NS anchor holes 1035. As with capped leading-edge base 720, NS leading-edge unit 1010 has NS cavity 1055 that receives home-run wiring 40 (FIG. 10C). FIG. 10C also shows PV module 10, having glass 1060, module frame 310, semiconductor layer 311 connected to NS leading-edge unit 1010 using spring clips 1020. Other versions could use bolts or other connectors extending through the side of the module frame 310 into the leading-edge units 110, 111. The figure also shows screw anchor 1050 installed through NS anchor holes 1035, in NS thick flange 1040, a distance into the ground. This distance is 1 to 4 ft below grade typically.

These components can be produced using any commonly used production method, such as extrusion. Metal- and polymer-based materials are useful for these components. The width of NS leading-edge units 1010 ranges from 3 to 4 ft. The length of NS leading-edge units 1010 ranges from 6 to 7 ft. The height of NS leading-edge units 1010 ranges from 1 to 2 in from grade to top of module frame on grade. Those of ordinary skill in the art will recognize that the dimensions of the NS leading-edge units 1010 influence their function, including their aerodynamic function. Various portions of NS leading-edge units 1010 have thicknesses or wall thicknesses ranging from 0.05 in to 0.5 in for extruded versions.

Figure 11A:
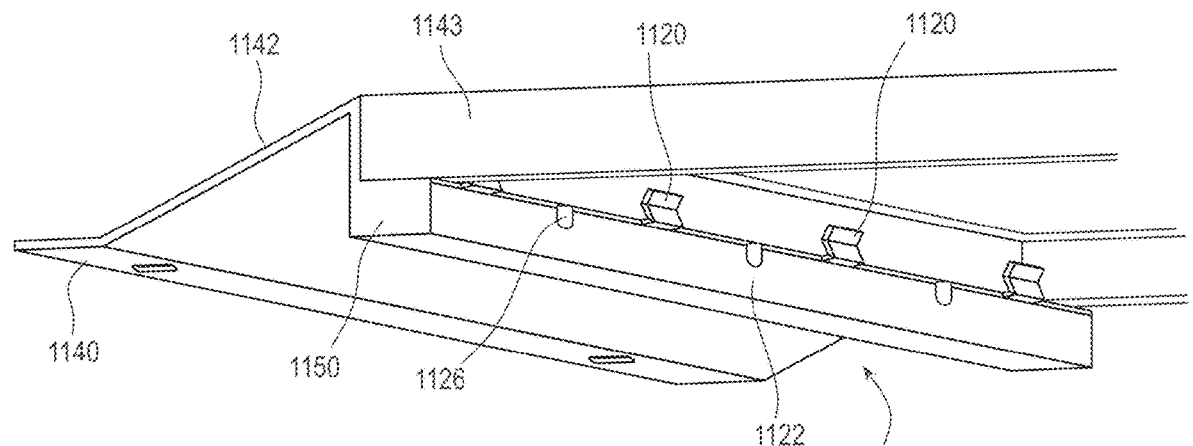
FIG. 11A is a perspective view of another version of the disclosed devices.
Figure 11B:
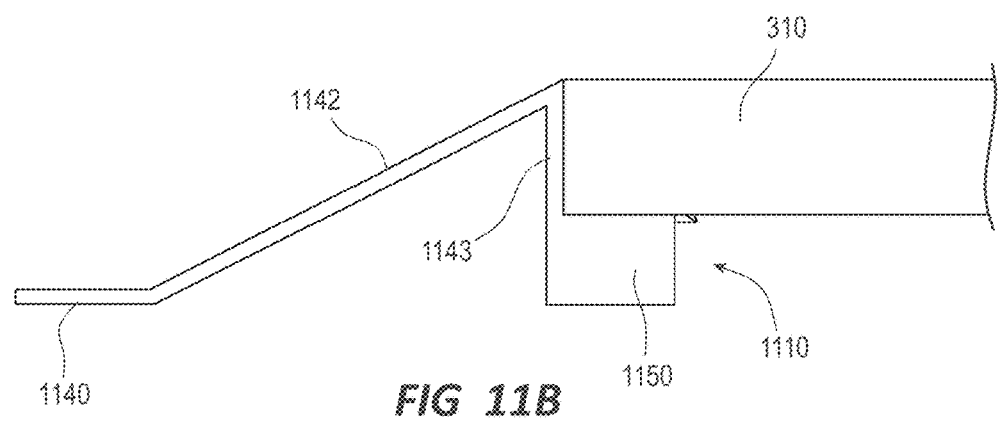
FIG. 11B is a cross-section view of the device of FIG. 11A.
Figure 11C:
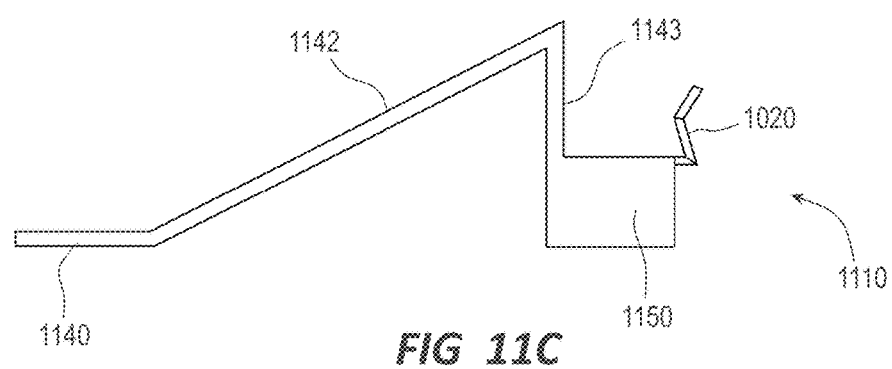
FIG. 11C is another cross-section view of the device of FIG. 11A.

FIG. 11A and FIG. 11B depict standoff (SO) leading-edge unit 1110. SO leading-edge unit 1110 is like NS leading-edge unit 1010 except that it has an additional component, standoff 1150. SO leading-edge unit 1110 comprises SO thick flange 1140 connected by SO angled portion 1142 to SO wall 1143. Standoff 1150 has 2-8 spring clips 1120 spaced along and extending up from the SO rear edge 1130 at the rear edge of standoff 1150. FIG. 11A also shows SO module alignment slot 1122, SO bonding slot 1131, and SO anchor holes 1135. SO anchor holes 1135 pierce SO thick flange 1140. As with capped leading-edge base 720, SO leading-edge unit 1110 has SO cavity 1155 that receives home-run wiring 40 (FIG. 11C). FIG. 11C also shows PV module 10, having glass 1060, module frame 310 connected to SO leading-edge unit 1110 using spring clips 1120.

These components can be produced using any commonly used production method, such as extrusion. Metal- and polymer-based materials are useful for these components. The width of SO leading-edge units 1110 ranges from 3 to 4 ft. The length of SO leading-edge units 1110 ranges from 6 to 7 ft. The height of SO leading-edge units 1110 ranges from 1 to 2 in from grade to top of module frame on grade. Those of ordinary skill in the art will recognize that the dimensions of the SO leading-edge units 1110 influence their function, including their aerodynamic function. Various portions of SO leading-edge units 1110 have thicknesses or wall thicknesses ranging from thicknesses or wall thicknesses ranging from 0.05 in to 0.5 in for extruded versions.

Figure 12:
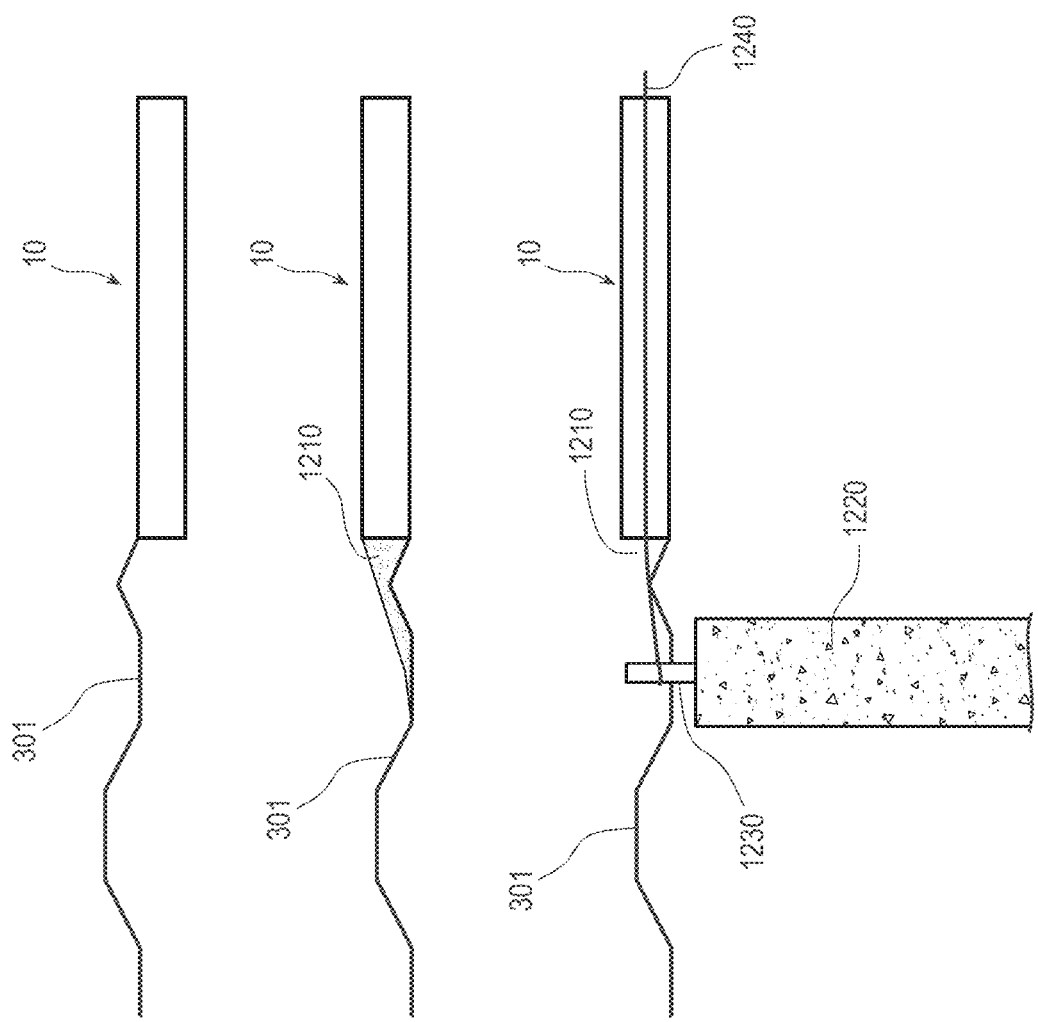
FIG. 12 is a cross-section of alternatives to the disclosed devices.

FIG. 12 Alternate methods to achieving the leading-edge units' effects include placing a module 10 flush with grade 301, piling aggregate base up to top of module frame, and supplying a pier and post foundation without an aggregate base.

Unless defined otherwise, all technical and scientific terms used in this document have the same meanings as commonly understood by one skilled in the art to which the disclosed invention pertains. Singular forms—a, an, and the—include plural referents unless the context indicates otherwise. Thus, a reference to "fluid" refers to one or more fluids, such as two or more fluids, three or more fluids, etc. When an aspect is said to include a list of components, the list is representative. If the component choice is limited explicitly to the list, the disclosure will say so. Listing components acknowledges that exemplars exist for each component and any combination of the components—including combinations that exclude any one or any combination of the listed components. For example, "component A is chosen from A, B, or C" discloses exemplars with A, B, C, AB, AC, BC, and ABC. It also discloses (AB but not C), (AC but not B), and (BC but not A) as exemplars, for example. Combinations that one of ordinary skill in the art knows to be incompatible with each other or with the components' function in this device are excluded from this device, in some exemplars.

When an element or layer is called "on", "engaged to", "connected to" or "coupled to" another element or layer, it may be directly on, engaged, connected, or coupled to the other element or layer, or intervening elements or layers may be present. When an element is called "directly on", "directly engaged to", "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.).

Although the terms first, second, third, etc. may describe various elements, components, regions, layers, or sections, these elements, components, regions, layers, or sections should not be limited by these terms. These terms may distinguish only one element, component, region, layer, or section from another region, layer, or section. Terms such as "first", "second", and other numerical terms do not imply a sequence or order unless indicated by the context. Thus, a first element, component, region, layer, or section discussed below could be termed a second element, component, region, layer, or section without departing from this disclosure.

Spatially relative terms, such as "inner", "outer", "beneath", "below", "lower", "above", "upper" may be used for ease of description to describe one element or feature's relationship to another element or feature as illustrated in the figures. Spatially relative terms may be intended to encompass different orientations of the device in use or operation and the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors interpreted.

The description of the exemplars has been provided for illustration and description. It is not intended to be exhaustive or to limit the invention. And various exemplars have been described above. For convenience's sake, combinations of aspects composing invention exemplars have been listed so that one of ordinary skill in the art may read them exclusive of each other when they are not necessarily intended to be exclusive. But a recitation of an aspect for one exemplar discloses its use in all exemplars in which that aspect can be incorporated without undue experimentation. Likewise, a recitation of an aspect as composing part of an exemplar is a tacit recognition that a supplementary exemplar excludes that aspect explicitly. All patents, test procedures, and other documents cited in this specification are incorporated by reference if this material follows this specification and for all jurisdictions in which such incorporation is permitted. The same may also be varied. Such variations are not a departure from the invention, and all such modifications are included within the invention's scope.

While particular exemplars of the present invention have been shown and described, it will be obvious to those skilled in the art that changes and modifications can be made without departing from the exemplars of this invention in its broader aspects and, therefore, the appended claims are to encompass within their scope all such changes and modifications as fall within the true, intended, explained, disclose, and understood scope and spirit of this invention's many exemplars and alternative descriptions.

Some exemplars recite ranges. When this is done, it discloses the ranges as a range and disclose each point within the range, including endpoints. For those exemplars that disclose a specific value or condition for an aspect, supplementary exemplars exist that are otherwise identical but that specifically exclude the value or the conditions for the aspect.

The following description of several exemplars describes non-limiting examples that further illustrate the invention. No titles of sections contained herein, including those appearing above, are limitations on the invention, but rather they are provided to structure the illustrative description of the invention provided by the specification.

Any methods and materials similar or equivalent to those described in this document can be used in the practice or testing of the present invention. This disclosure incorporates by reference all publications mentioned in this disclosure and the information disclosed in the publications.

This disclosure discusses publications only to facilitate describing the invention. Their inclusion in this document is not an admission they are effective prior art to this invention, nor does it indicate that their dates of publication or effectiveness are as printed on the document.

EXEMPLARS

Exemplar 1: A utility-scale PV array comprising several PV modules on or contacting native topography or a smoothed or substantially flat portion of the ground in an array and a perimeter leading-edge units that comprises a leading-edge unit adapted to direct wind and water across the array.

Exemplar 2: The array of exemplar 1 wherein the leading-edge unit is adapted to direct wind with wind speeds of greater than 100, 150, 175, or 200 miles per hour, or 160, 240, 282, or 322 kilometers per hour across the array.

Exemplar 6: The array of exemplar 2 wherein the leading-edge unit comprises an upper side, a horizontal portion, and an angled portion.

Exemplar 7: The array of exemplar 6 wherein the leading-edge unit further comprises a module alignment hole and a bonding hole.

Exemplar 8: The array of exemplar 7 wherein the leading-edge unit further comprises a minimum of one corner leading-edge unit.

Exemplar 9: The array of exemplar 8 wherein the leading-edge unit further comprises a maximum of 30 corner leading-edge units.

Exemplar 10: The array of exemplar 9 wherein the leading-edge unit further comprises a maximum of 4 corner leading-edge units.

Exemplar 11: The array of exemplar 10 further comprising a connecting cable that passes through the module alignment hole and several PV modules.

Exemplar 12: The array of exemplar 11 wherein several PV modules is 2 or more PV modules.

Exemplar 13: The array of exemplar 12 wherein several PV modules is 1 to 100 PV modules.

Exemplar 14: The array of exemplar 13 wherein connecting cable comprises an end connector.

Exemplar 15: The array of exemplar 14 wherein the leading-edge unit further comprises a culvert portion.

Exemplar 16: The array of exemplar 15 wherein the leading-edge unit further comprises a threaded insert.

Exemplar 17: The array of exemplar 3 wherein the leading-edge unit comprises a thick flange; a front edge; a vertical wall; an inclined surface; and a back edge.

Exemplar 18: The array of exemplar 17 wherein the leading-edge unit further comprises a cavity under the inclined surface.

Exemplar 19: The array of exemplar 18 wherein the leading-edge unit comprises a capped leading-edge base and a cap.

Exemplar 20: The array of exemplar 19 wherein the cap comprises a tongue and the capped leading-edge base comprises a longitudinal slot and the tongue is disposed in the slot.

Exemplar 21: The array of exemplar 20 wherein the vertical wall is a tall flange wall extending up from the thick flange and forming a back and the leading-edge unit further comprises a tall flange incline surface on a top edge of the tall flange wall, a short flange wall extending up from the thick flange a distance from the front edge, and a short flange incline surface on a top edge of the short flange wall.

Exemplar 22: The array of exemplar 21 wherein the thick flange extends back from the front edge and the inclined surface connects to the thick flange and extends back, inclining upward, to connect to a top edge of the vertical wall.

Exemplar 23: The array of exemplar 22 wherein the leading-edge unit further comprises a thin flange extending horizontally from the back and forming a panel receiving surface.

Exemplar 24: The array of exemplar 23 wherein the leading-edge unit further comprises one or more clips extending vertically from a back edge of the panel receiving surface.

Exemplar 25: The array of exemplar 24 wherein the leading-edge unit further comprises a module alignment slot and a bonding slot extending along a short axis of the thin flange and horizontally through the leading-edge unit; and an anchor hole disposed vertically through the thick flange.

Exemplar 26: The array of exemplar 22 wherein the leading-edge unit further comprises a tubular standoff extending horizontally back and down from a bottom edge of the vertical wall and forming a panel receiving surface on top of the standoff.

Exemplar 27: The array of exemplar 26 wherein the leading-edge unit further comprises one or more clips extending vertically from a back edge of the panel receiving surface.

Exemplar 28: The array of exemplar 27 wherein the leading-edge unit further comprises a module alignment slot and a bonding slot extending along a short axis of the standoff and horizontally through the leading-edge unit; and an anchor hole disposed vertically through the thick flange.

Exemplar 29: The array of exemplar 28 wherein the leading-edge unit further comprises a cavity under the inclined surface.

Exemplar 30: A system comprising one or more leading-edge units surrounding a PV module array.

Exemplar 31: The system of exemplar 30 wherein the leading-edge units are adapted to direct wind with wind speeds of greater than 100, 150, 175, or 200 miles per hour, or 160, 240, 282, or 322 kilometers per hour across the array causing a downforce on the array.

Exemplar 34: The system of exemplar 31 wherein the leading-edge unit further comprises a minimum of one corner leading-edge unit.

Exemplar 35: The system of exemplar 34 further comprising up to 30 corner leading-edge units.

Exemplar 36: The system of exemplar 35 further comprising up to 4 corner leading-edge units.

Exemplar 37: The system of exemplar 36 wherein the leading-edge unit comprises an upper side, a horizontal portion, and an angled portion.

Exemplar 38: The system of exemplar 37 wherein the leading-edge unit further comprises a module alignment hole and a bonding hole.

Exemplar 39: The system of exemplar 38 wherein the module alignment hole is adapted to receive a connecting cable.

Exemplar 40: The system of exemplar 39 wherein the module alignment hole is disposed at a midpoint of a length of the leading-edge unit.

Exemplar 41: The system of exemplar 40 wherein the leading-edge unit further comprises a culvert portion.

Exemplar 42: The system of exemplar 41 wherein the leading-edge unit further comprises a threaded insert.

Exemplar 43: The system of exemplar 31 wherein the leading-edge unit comprises a thick flange; a front edge; a vertical wall; an inclined surface; and a back edge.

Exemplar 44: The system of exemplar 43 wherein the leading-edge unit further comprises a cavity under the inclined surface.

Exemplar 45: The system of exemplar 44 wherein the leading-edge unit comprises a module alignment hole adapted to receive a connecting cable.

Exemplar 46: The system of exemplar 45 wherein the module alignment hole is disposed at a midpoint of a length of the leading-edge unit.

Exemplar 47: The system of exemplar 46 wherein the leading-edge unit comprises a capped leading-edge base and a cap.

Exemplar 48: The system of exemplar 47 wherein the cap comprises a tongue and the capped leading-edge base comprises a longitudinal slot and the cap is disposed in the slot.

Exemplar 49: The system of exemplar 48 wherein the vertical wall is a tall flange wall extending up from the thick flange and forming a back and the leading-edge unit further comprises a tall flange incline surface on a top edge of the tall flange wall, a short flange wall extending up from the thick flange a distance from the front edge, and a short flange incline surface on a top edge of the short flange wall.

Exemplar 50: The system of exemplar 46 wherein the thick flange extends back from the front edge and the inclined surface connects to the thick flange and extends back, inclining upward, to connect to a top edge of the vertical wall.

Exemplar 51: The system of exemplar 50 wherein the leading-edge unit further comprises a thin flange extending horizontally from the back and forming a panel receiving surface.

Exemplar 52: The system of exemplar 51 wherein the leading-edge unit further comprises one or more clips extending vertically from a back edge of the panel receiving surface.

Exemplar 53: The system of exemplar 52 wherein the leading-edge unit further comprises a module alignment slot and a bonding slot extending along a short axis of the thin flange and horizontally through the leading-edge unit; and an anchor hole disposed vertically through the thick flange.

Exemplar 54: The system of exemplar 43 wherein the leading-edge unit further comprises a tubular standoff extending horizontally back and down from a bottom edge of the vertical wall and forming a panel receiving surface on top of the standoff.

Exemplar 55: The system of exemplar 54 wherein the leading-edge unit further comprises one or more clips extending vertically from a back edge of the panel receiving surface.

Exemplar 56: The system of exemplar 55 wherein the leading-edge unit further comprises a module alignment slot and a bonding slot extending along a short axis of the standoff and horizontally through the leading-edge unit; and an anchor hole disposed vertically through the thick flange.

Exemplar 57: The system of exemplar 56 wherein the leading-edge unit further comprises a cavity under the inclined surface.

Exemplar 58: A device comprising several leading-edge units adapted to surround a PV module array.

Exemplar 59: The device of exemplar 58 wherein the leading-edge units are adapted to direct wind with wind speeds of greater than 100, 150, 175, or 200 miles per hour, or 160, 240, 282, or 322 kilometers per hour across the array causing a downforce on the array.

Exemplar 62: The device of exemplar 59 wherein at least one of the leading-edge units comprise a corner.

Exemplar 63: The device of exemplar 62 wherein at least one of the leading-edge units comprise an upper side, a horizontal portion, and an angled portion.

Exemplar 64: The device of exemplar 63 wherein at least one of the leading-edge units further comprise a module alignment hole and a bonding hole.

Exemplar 65: The device of exemplar 64 wherein the module alignment hole is adapted to receive a connecting cable.

Exemplar 66: The device of exemplar 65 wherein the module alignment hole is disposed at a midpoint of a length of the leading-edge units.

Exemplar 67: The device of exemplar 66 wherein at least one of the leading-edge units further comprise a culvert portion.

Exemplar 68: The device of exemplar 67 wherein at least one of the leading-edge units further comprise a threaded insert.

Exemplar 69: The device of exemplar 59 wherein the leading-edge units comprise a thick flange; a front edge; a vertical wall; an inclined surface; and a back edge.

Exemplar 70: The device of exemplar 69 wherein the leading-edge units further comprise a cavity under the inclined surface.

Exemplar 71: The device of exemplar 70 wherein the leading-edge units comprise a module alignment hole adapted to receive a connecting cable.

Exemplar 72: The device of exemplar 71 wherein the module alignment hole is disposed at a midpoint of a length of the leading-edge units.

Exemplar 73: The device of exemplar 72 wherein the leading-edge units comprise a capped leading-edge base and a cap.

Exemplar 74: The device of exemplar 73 wherein the cap comprise a tongue and the capped leading-edge base comprise a longitudinal slot and the cap is disposed in the slot.

Exemplar 75: The device of exemplar 74 wherein the vertical wall is a tall flange wall extending up from the thick flange and forming a back and the leading-edge units further comprise a tall flange incline surface on a top edge of the tall flange wall, a short flange wall extending up from the thick flange a distance from the front edge, and a short flange incline surface on a top edge of the short flange wall.

Exemplar 76: The device of exemplar 72 wherein the thick flange extends back from the front edge and the inclined surface connects to the thick flange and extends back, inclining upward, to connect to a top edge of the vertical wall.

Exemplar 77: The device of exemplar 76 wherein the leading-edge units further comprise a thin flange extending horizontally from the back and forming a panel receiving surface.

Exemplar 78: The device of exemplar 77 wherein the leading-edge units further comprise one or more clips extending vertically from a back edge of the panel receiving surface.

Exemplar 79: The device of exemplar 78 wherein the leading-edge units further comprise a module alignment slot and a bonding slot extending along a short axis of the thin flange and horizontally through the leading-edge units; and an anchor hole disposed vertically through the thick flange.

Exemplar 80: The device of exemplar 76 wherein the leading-edge units further comprise a tubular standoff extending horizontally back and down from a bottom edge of the vertical wall and forming a panel receiving surface on top of the standoff.

Exemplar 81: The device of exemplar 80 wherein the leading-edge units further comprise one or more clips extending vertically from a back edge of the panel receiving surface.

Exemplar 82: The device of exemplar 81 wherein the leading-edge units further comprise a module alignment slot and a bonding slot extending along a short axis of the standoff and horizontally through the leading-edge units; and an anchor hole disposed vertically through the thick flange.

Exemplar 83: The device of exemplar 82 wherein the leading-edge units further comprise a cavity under the inclined surface.

Exemplar 84: A method comprising providing PV modules; placing several PV modules on or contacting native topography or a smoothed or substantially flat portion of the ground in an array; and holding the array together and down.

Exemplar 85: The method of exemplar 84 wherein holding the array together and down comprises causing air pressure to push the array against native topography or a smoothed or substantially flat portion of the ground.

Exemplar 86: The method of exemplar 85 wherein causing air pressure to push the array against native topography or a smoothed or substantially flat portion of the ground comprises providing a perimeter leading-edge unit that comprises a leading-edge unit that directs wind across the array.

Exemplar 87: The method of exemplar 86 wherein the wind has a wind speed of greater than 100, 150, 175, or 200 miles per hour, or 160, 240, 282, or 322 kilometers per hour.

Exemplar 88: The method of exemplar 87 wherein the perimeter leading-edge units comprises more than one leading-edge unit.

Exemplar 91: The method of exemplar 90 wherein the leading-edge unit comprises an upper side, a horizontal portion, and an angled portion.

Exemplar 92: The method of exemplar 91 wherein the leading-edge unit further comprises a module alignment hole and a bonding hole.

Exemplar 93: The method of exemplar 92 wherein the leading-edge unit further comprises a minimum of one corner leading-edge unit.

Exemplar 94: The method of exemplar 93 wherein the leading-edge unit further comprises a maximum amount of 30 corner leading-edge units.

Exemplar 95: The method of exemplar 94 wherein the leading-edge unit further comprises a maximum of 4 corner leading-edge units.

Exemplar 96: The method of exemplar 95 further comprising connecting the leading-edge unit to a connecting cable that passes through a module alignment hole and several PV modules.

Exemplar 97: The method of exemplar 96 wherein several PV modules is 2 or more PV modules.

Exemplar 98: The method of exemplar 97 wherein several PV modules is 1 to 100 PV modules.

Exemplar 99: The method of exemplar 98 wherein connecting comprises fitting an end connector to the connecting cable.

Exemplar 102: The method of exemplar 101 wherein the leading-edge unit further comprises a culvert portion.

Exemplar 103: The method of exemplar 102 wherein the leading-edge unit further comprises a threaded insert.

Exemplar 104: The method of exemplar 99 wherein the leading-edge unit comprises a thick flange; a front edge; a vertical wall; an inclined surface; and a back edge.

Exemplar 105: The method of exemplar 104 wherein the leading-edge unit further comprises a cavity under the inclined surface.

Exemplar 106: The method of exemplar 105 wherein the leading-edge unit further comprises a tongue disposed in a longitudinal slot of a capped leading-edge base.

Exemplar 107: The method of exemplar 106 wherein the vertical wall is a tall flange wall extending up from the thick flange and forming a back and the leading-edge unit further comprises a tall flange incline surface on a top edge of the tall flange wall, a short flange wall extending up from the thick flange a distance from the front edge, and a short flange incline surface on a top edge of the short flange wall.

Exemplar 108: The method of exemplar 107 wherein the leading-edge unit further comprises a thin flange extending horizontally from the back and forming a panel receiving surface.

Exemplar 109: The method of exemplar 105 wherein the thick flange extends back from the front edge and the inclined surface connects to the thick flange and extends back, inclining upward, to connect to a top edge of the vertical wall.

Exemplar 110: The method of exemplar 109 wherein the leading-edge unit further comprises a thin flange extending horizontally back from a bottom edge of the vertical wall and forming a panel receiving surface.

Exemplar 111: The method of exemplar 110 wherein the leading-edge unit further comprises one or more clips extending vertically from a back edge of the panel receiving surface.

Exemplar 112: The method of exemplar 111 wherein the leading-edge unit further comprises a module alignment slot and a bonding slot extending along a short axis of the thin flange and horizontally through the leading-edge unit; and an anchor hole disposed vertically through the thick flange.

Exemplar 113: The method of exemplar 112 wherein the leading-edge unit further comprises a cavity under the inclined surface.

Exemplar 114: The method of exemplar 109 wherein the leading-edge unit further comprises a tubular standoff extending horizontally back and down from a bottom edge of the vertical wall and forming a panel receiving surface on top of the standoff.

Exemplar 115: The method of exemplar 114 wherein the leading-edge unit further comprises one or more clips extending vertically from a back edge of the panel receiving surface.

Exemplar 116: The method of exemplar 115 wherein the leading-edge unit further comprises a module alignment slot and a bonding slot extending along a short axis of the standoff and horizontally through the leading-edge unit; and an anchor hole disposed vertically through the thick flange.

Exemplar 117: The method of exemplar 116 wherein the leading-edge unit further comprises a cavity under the inclined surface.

Exemplar 118: A method comprising providing a perimeter leading edge that comprises a leading-edge unit that directs wind across a PV array.

Exemplar 119: The method of exemplar 118 wherein the wind has a wind speed of greater than 100, 150, 175, or 200 miles per hour, or 160, 240, 282, or 322 kilometers per hour.

Exemplar 120: The method of exemplar 119 wherein the perimeter leading edge comprises more than one leading-edge unit.

Exemplar 123: The method of exemplar 122 wherein the leading-edge unit comprises an upper side, a horizontal portion, and an angled portion.

Exemplar 124: The method of exemplar 123 wherein the leading-edge unit further comprises a module alignment hole and a bonding hole.

Exemplar 125: The method of exemplar 124 wherein at least one of the leading-edge units comprise a corner.

Exemplar 126: The method of exemplar 125 wherein a maximum of 30 leading units comprise a corner.

Exemplar 127: The method of exemplar 126 wherein a maximum of 4 leading units comprise a corner.

Exemplar 128: The method of exemplar 127 further comprising connecting the leading-edge unit to a connecting cable that passes through a module alignment hole and several PV modules.

Exemplar 129: The method of exemplar 128 wherein several PV modules is 2 or more PV modules.

Exemplar 130: The method of exemplar 129 wherein several PV modules is 1 to 100 PV modules.

Exemplar 131: The method of exemplar 130 wherein connecting comprises fitting an end connector to the connecting cable.

Exemplar 134: The method of exemplar 133 wherein the leading-edge unit further comprises a culvert portion.

Exemplar 135: The method of exemplar 134 wherein the leading-edge unit further comprises a threaded insert.

Exemplar 136: The method of exemplar 135 wherein the leading-edge unit comprises a thick flange; a front edge; a vertical wall; an inclined surface; and a back edge.

Exemplar 137: The method of exemplar 136 wherein the leading-edge unit further comprises a cavity under the inclined surface.

Exemplar 138: The method of exemplar 137 wherein the leading-edge unit comprises a capped leading-edge base and a cap.

Exemplar 139: The method of exemplar 138 wherein
the cap comprises a tongue,
the capped leading-edge base comprises a longitudinal slot,
and
the tongue is disposed in the slot.

Exemplar 140: The method of exemplar 139 wherein the vertical wall is a tall flange wall extending up from the thick flange and forming a back and the leading-edge unit further comprises a tall flange incline surface on a top edge of the tall flange wall, a short flange wall extending up from the thick flange a distance from the front edge, and a short flange incline surface on a top edge of the short flange wall.

Exemplar 141: The method of exemplar 140 wherein the leading-edge unit further comprises a thin flange extending horizontally from the back and forming a panel receiving surface.

Exemplar 142: The method of exemplar 141 wherein the thick flange extends back from the front edge and the inclined surface connects to the thick flange and extends back, inclining upward, to connect to a top edge of the vertical wall.

Exemplar 143: The method of exemplar 142 wherein the leading-edge unit further comprises a thin flange extending horizontally back from a bottom edge of the vertical wall and forming a panel receiving surface.

Exemplar 144: The method of exemplar 143 wherein the leading-edge unit further comprises one or more clips extending vertically from a back edge of the panel receiving surface.

Exemplar 145: The method of exemplar 144 wherein the leading-edge unit further comprises a module alignment slot and a bonding slot extending along a short axis of the thin flange and horizontally through the leading-edge unit; and an anchor hole disposed vertically through the thick flange.

Exemplar 146: The method of exemplar 145 wherein the leading-edge unit further comprises a cavity under the inclined surface.

Exemplar 147: The method of exemplar 146 wherein the thick flange extends back from the front edge and the inclined surface connects to the thick flange and extends back, inclining upward, to connect to a top edge of the vertical wall.

Exemplar 148: The method of exemplar 147 wherein the leading-edge unit further comprises a tubular standoff extending horizontally back and down from a bottom edge of the vertical wall and forming a panel receiving surface on top of the standoff.

Exemplar 149: The method of exemplar 148 wherein the leading-edge unit further comprises a module alignment slot and a bonding slot extending along a short axis of the standoff and horizontally through the leading-edge unit; and an anchor hole disposed vertically through the thick flange.

Exemplar 150: The method of exemplar 149 wherein the leading-edge unit further comprises a cavity under the inclined surface.

The invention claimed is:

1. A utility-scale PV array comprising:
several PV modules on or contacting native topography or a smoothed or substantially flat portion of the ground in an array;
1 to 100 PV modules;
a maximum of 30 corner leading-edge units; and
a perimeter leading edge that comprises a leading-edge unit adapted to direct wind and water across the array;
wherein the leading-edge unit comprises an upper side, a horizontal portion, and an angled portion;
wherein the leading-edge unit further comprises a module alignment hole and a bonding hole;
wherein a connecting cable passes through the module alignment hole and the 1 to 100 PV modules; and
wherein the perimeter leading edge comprises more than one leading-edge unit.

2. The array of claim 1 wherein the leading-edge unit comprises a thick flange; a front edge; a vertical wall; an inclined surface; and a back edge.

3. The array of claim 2 wherein the leading-edge unit further comprises a standoff extending horizontally back and down from a bottom edge of the vertical wall and forming a panel receiving surface on top of the standoff.

4. A utility-scale PV array comprising several PV modules on or contacting native topography or a smoothed or substantially flat portion of the ground in an array and a perimeter leading edge that comprises a leading-edge unit adapted to direct wind and water across the array
wherein
the perimeter leading edge comprises more than one leading-edge unit
the leading-edge unit comprises a thick flange; a front edge; a vertical wall; an inclined surface; and a back edge
the leading-edge unit comprises a capped leading-edge base and a cap,
the cap comprises a tongue,
the capped leading-edge base comprises a longitudinal slot,
and
the tongue is disposed in the slot.

5. The array of claim 4 wherein the leading-edge unit further comprises one or more clips extending vertically from a back edge of the panel receiving surface.

* * * * *